US012809985B2

(12) United States Patent
Ranganathan et al.

(10) Patent No.: US 12,809,985 B2
(45) Date of Patent: Nov. 24, 2026

(54) ATTESTATION FOR BIDIRECTIONAL ELASTIC WORKLOAD MIGRATION IN CLOUD-TO-EDGE SETTINGS

(71) Applicant: Intel Products IP LLC, Santa Clara, CA (US)

(72) Inventors: Vidya Ranganathan, Bangalore (IN); Sunil Cheruvu, Tempe, AZ (US); Anahit Tarkhanyan, Cupertino, CA (US)

(73) Assignee: Intel Products IP LLC, Santa Clara, CA (US)

( * ) Notice: Subject to any disclaimer, the term of this patent is extended or adjusted under 35 U.S.C. 154(b) by 0 days.

(21) Appl. No.: 18/217,341

(22) Filed: Jun. 30, 2023

(65) Prior Publication Data

US 2023/0342478 A1 Oct. 26, 2023

Related U.S. Application Data

(60) Provisional application No. 63/393,321, filed on Jul. 29, 2022.

(51) Int. Cl.

*G06F 21/57* (2013.01)
*G06F 9/455* (2018.01)

(52) U.S. Cl.

CPC ........ *G06F 21/577* (2013.01); *G06F 9/45558* (2013.01); *G06F 2009/4557* (2013.01)

(58) Field of Classification Search

None

See application file for complete search history.

(56) References Cited

U.S. PATENT DOCUMENTS

2022/0058732 A1* 2/2022 Reses .................. G06Q 20/065
2023/0134096 A1* 5/2023 Boyapalle ............... G06N 7/01
718/105

* cited by examiner

*Primary Examiner* — Brandon Hoffman

(74) *Attorney, Agent, or Firm* — Schwegman Lundberg & Woessner, P.A.

(57) ABSTRACT

Various systems and methods are described for implementing attestation operations. A computing device includes a processor; and memory to store instructions, which when executed by the processor, cause the computing device to: receive a workload from a source computing device over a network shared with the computing device; determine whether the workload has valid attestation; establish attestation for the workload when the workload does not have valid attestation; determine whether the attestation is compliant with a policy; and execute the workload when the attestation is compliant with the policy.

20 Claims, 19 Drawing Sheets

ATTESTATION FOR BIDIRECTIONAL ELASTIC WORKLOAD MIGRATION IN CLOUD-TO-EDGE SETTINGS

PRIORITY APPLICATION

This application claims the benefit of priority to U.S. Provisional Application Ser. No. 63/393,321, filed Jul. 29, 2022, which is incorporated herein by reference in its entirety.

TECHNICAL FIELD

Embodiments described herein generally relate to data processing in networked computing environments, and in particular, to the use of computing technologies for trust, verification, and attestation of computing entities and assets.

BACKGROUND

Confidential Computing generally refers to a category of approaches which provides protection of software services, such as through the use of Trusted Execution Environments (TEEs) and attestation. Attestation, as applied in a networked computing setting, is a mechanism that allows a relying party to verify the integrity of remote software (e.g., executing in a TEE) by evaluating hardware-based evidence generated by the remote software. For instance, at a high level, if the relying party knows the architecture of a distributed software, it can attest each one of its services.

Attestation of single software services is a powerful integrity-verification mechanism. However, modern software is rarely comprised of one or a few services. Tens and hundreds of services can be involved in a distributed software deployment, and each service can have many instances for scaling purposes. Attesting each instance of every service can quickly become unmanageable. Moreover, to fully ensure trust and compute security, the relying party must have an intimate knowledge of the architecture of the distributed software and be notified when a new instance joins the distributed software. Because of these reasons, attestation initiated with existing approaches does not scale well in many types of real-world computing deployments, such as those provided by "edge computing" and related "edge," "edge-cloud," and "near-cloud" environments.

Edge computing, at a general level, refers to the transition of compute and storage resources closer to endpoint devices (e.g., consumer computing devices, user equipment, etc.), in order to optimize total cost of ownership, reduce application latency, improve service capabilities, and improve compliance with compute security or data privacy requirements. Edge computing may, in some scenarios, provide a cloud-like distributed service that offers orchestration and management for applications among many types of storage and compute resources. As a result, some implementations of edge computing have been referred to as the "edge cloud" or the "fog," as powerful computing resources previously available only in large remote data centers are moved closer to endpoints and made available for use by consumers at the "edge" of the network.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

In the following description, methods, configurations, and related apparatuses are disclosed for features of attestation. In an example, a Decentralized Trust Architecture is disclosed. This includes peer-to-peer trust with multiple attestations for bidirectional elastic workload migration across cloud-to-edge spectrum. In another example, a centralized and immutable trust architecture is disclosed. This includes verifiable attestations for bidirectional workload migration in a cloud-to-edge spectrum.

Decentralized Trust Architecture

Digital transformations have opened and widened the pathway on the Edge with customers looking for actionable insights anywhere across the Cloud2Edge (C2E) spectrum with data flowing across IoT devices, IoT Edge, Network Edge, Core Network, and Data Center environments. Whether it is a tar-archive, a zip archive, SDK, containers, or some form of image, these objects, generally termed as workloads (WLs) tend to migrate from the end-user inwards into the platform for deployments and executions. The unidirectional workflow and communication/compute security concerns are handled by the consumer (Platform) itself for compliance and governance. Further, while the data and workloads (WLs) are secured at the individual locations, a consistent security posture is needed as they move dynamically bidirectionally across the C2E spectrum. This impacts the legacy enterprise-to-enterprise (E2E) architecture with movement of data and workloads. Data and compute may move across physical boundaries for the efficiency and compliance.

The systems described herein aim to address the zero-trust problem with data privacy requirements that may increase usage of cloud-to-edge compute security, and data geo-fencing governance by providing a decentralized, "security first" architecture. Conventional approaches today do not support C2E bidirectional migration based on zero-trust and standardization to facilitate workload (WL) orchestration.

As will be understood, the following decentralized approach provides a framework for decentralization of trust as WLs migrate in the C2E environment. Specifically, the framework enables generation of peer-to-peer trust as the WL moves across the nodes in the C2E network by establishing an attestation to the WL on various parameters and stored with the WL as metadata.

Figure 1A:
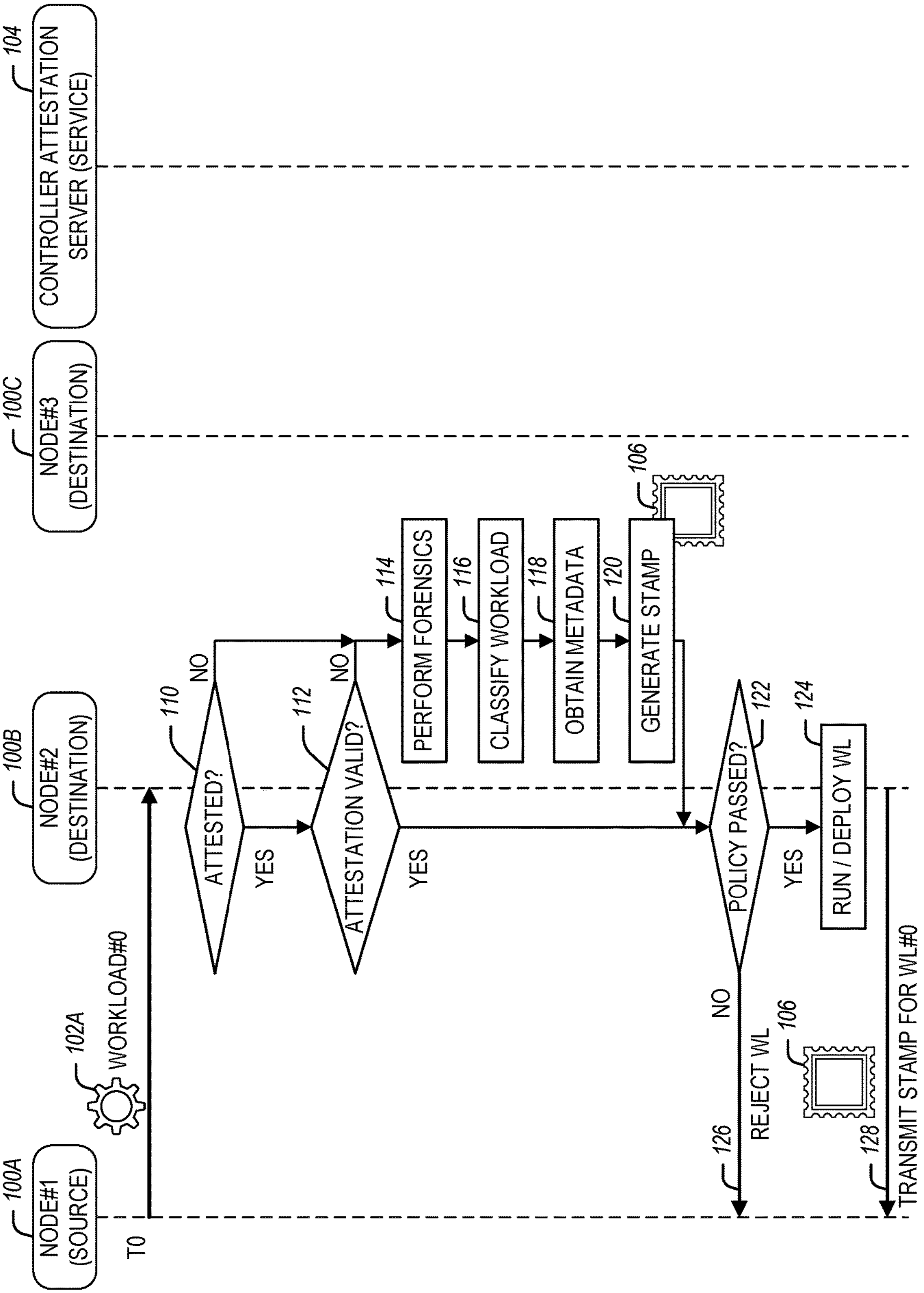
FIGS. 1A to 1C illustrate a decentralized architecture for cloud-to-edge trust establishment of workloads, according to an example.

FIG. 1A depicts an architecture for Cloud-to-Edge (C2E) trust establishment of workloads where there are three participating nodes (for example): node #1 100A, node #2 100B and node #3 100C for a given workflow for a workload (WL). Any node in the C2E topology can be source or destination at any point of time. A source node is the one from where the WL is originated and a destination node is where the WL is received for execution or deployment. There is also a controller attestation node 104 that provides attestation service in the distributed mode to all its consumers (seekers). It may be noted that there can be replicas of the controller attestation node 104 within in the cluster or across the clusters in a centralized model.

There are generally four decentralized use cases that are based on the way in which the WL is triggered, attested, or performing attestation on WL migration across the cloud-to-edge spectrum. These use cases will be discussed in the following sections. It is understood that systems and mechanisms may be used to address one or more use cases.

Decentralized Case #1: Migration of WL without any Prior Attestations from Source to Destination, where WL Attestation Happens at the Destination Node for the First Time.

FIG. 1A depicts node #1 100A as a source node and two other nodes 100B and 100C as destination nodes. This is continued in the depiction of FIGS. 1B and 1C. At time t0, a WL (WL #0 102A) along with its own identification based on a hashing algorithm is initialized and dispatched from source node (node #1 100A) to destination node (node #2 100B). On receipt of the workload WL #0 102A at the destination node, node #2 100B checks if the WL #0 102A is already attested by any of its peer participating nodes (decision operation 110). If the WL #0 102A was not attested before by any peer nodes, then the destination node 100B may perform the attestation. Attestation includes forensic analysis (operation 114) and other operations described below.

On the other hand, if the WL #0 102A was attested earlier, then the previous attestation is checked at the receiving node 100B to determine whether the WL #0 102A is valid and ready to consume based on its attestation stamp (decision operation 112). At this point, if the node accepts the previous attestation, then forensics at the node on the WL for further additional new attestation is skipped and the node proceeds for deployment or execution (operation 120). At this point, if the node's edge, cloud, and compute/communication security compliance is met by the workload's attestation based on the node policy then it is allowed to run (operation 124), otherwise it is rejected (operation 126).

If the WL #0 102A was previously attested (evidenced by a stamp), but the attestation is insufficient or suspicious, the WL #0 102A is subjected to forensics by the receiving node 100B (operation 114). Forensics on the workload is performed based on the type of the workload because it can be different formats, such as a tar-ball, an archive, an SDK, a HELM package, container images, binaries, or more. For performing forensics, the group of tools and frameworks that can be used may be based on the consensus received by the participating nodes and partners. If there is a standard that is formalized, then all the parties may have the same set of tools to perform the same analysis to generate results in common format. Tools and frameworks for forensics include static analysis, dynamic analysis, benchmarking, and auditing tools.

Forensics are performed on various vectors of compute security components and key performance indicators (KPIs) including vulnerabilities, privileges, permissions, performance by static analysis, dynamic analysis, benchmarking, and auditing (operation 114). The observations, inferences, and data collected out of forensics are gathered and classified using a category (operation 116). Categories may be expressed as "very low," "low," "medium," "high," and "very high." Alternatively, the workload can be classified using grades ranging from A through Z, numerical values or ranges, or other indicia to label categories.

Depending upon the parameter marked for classification the grade or range of grades may vary. The classification thus obtained is packaged with other metadata that is gathered and prepared (operation 118) for the attestation. The metadata for the workload may comprise of the following contents but not limited to: i) Origin of the WL; ii) WL Identifier, date, and checksum; iii) WL Classification; iv) WL type; and v) Compression state.

Once classification is complete, a stamp 106 is generated with the fields that are part of the metadata for the workload (operation 120). The stamp 106 generated by the receiving node 100B is referred to as self-generated stamp because the node generated the stamp rather than receiving it as a product of another node. Alternatively, the stamp 106 may be generated by the centralized controller (master) attestation node 104, as discussed below. In general, the stamp 106 is a collection of metadata that is used to store attestation data. It is understood that the "stamp" may be a token or other data structure that can be associated with the workload.

Figure 2:
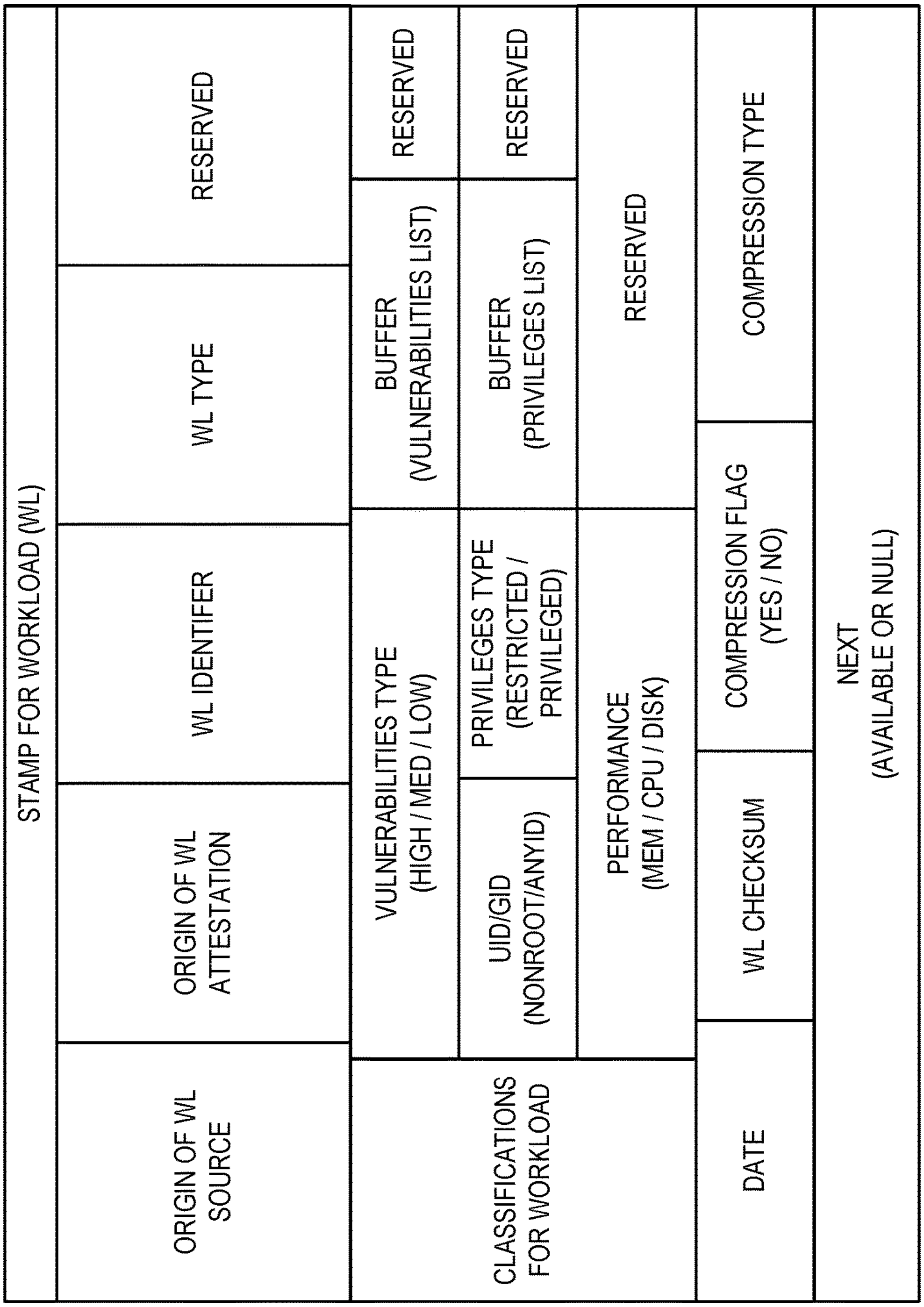
FIG. 2 illustrates a data structure of a stamp generated for attestation by a worker or a controller node, according to an example.

The pictorial representation provided in FIG. 2 shows the contents of the attestation stamp 106 that gets generated for the WL #0 102A by the destination node 100B. A brief explanation on each of these fields follows:

Origin of the WL attestation: This specifies the IP address of the node from where the workload was originally attested.

Origin of the WL source: This specifies the IP address of the node from where the workload was initiated for deployment.

WL Identifier: This is a number generated to identify the workload. It can be a value as populated by any hashing algorithm.

WL type: The workload generally can be in any format. It can be in any form as in an archive, a tar-ball, an SDK, a package, binaries, a container image, or the like. The type of the workload is indicated in this field, which provides information for forensic scans and analysis.

Classification of WL: This is the range of class that is determined by the destination node on receipt or by controlling attestation server by running static and dynamic analysis, or classification marked by previous runs across different nodes. The classification section is further divided in four fields as vulnerabilities, permissions, privileges, and performance. These are discussed in detail below.

Vulnerabilities: This section calls upon the vulnerabilities identified on analysis on the node. It provides a flexibility to dictate the range of vulnerability types identified as high, medium, or low and a list of vulnerabilities in the buffer section.

Privileges: This section describes the type or range of privilege required for the WL for deployment on the node. Example privileges include restricted and privileged. When a WL is marked as restricted, it indicates that the WL does not require any superuser privilege to execute or deploy. In contrast, when the WL is marked privileged, the WL requires superuser privileges to execute or deploy. The list of privileges such as network privileges, storage privileges, debug privileges, boot/install privileges and more can also be shown in the buffer section on the privilege listing.

Permissions: This indicates the user and group ids under which the WL is expected to run. An insight into an identifier such as User ID (e.g., UID/UID) can tell if the WL is non-root or root.

Performance: When WL deployment or execution is being discussed, it is not always about what the destination or receiving node expects from the WL for the run, but it is about what the WL also expects from the node. For example, a WL may expect the node to serve its requirement with a minimum amount of memory, compute, network capacity which is generally captured on its first run and is passed on into this field as a feeder for following runs on future nodes. This can be provided as an option in the payload or schema as part of the attestation.

As noted, FIG. 2 depicts a stamp generated for attestation by worker or controller (master) node. The features of this data structure include the following.

Date: This indicates the date on which the attestation was made on the node by post analysis of the WL.

WL checksum: Based on the size of the WL a message digest is generated and this indicates the checksum that gets generated. This helps to maintain the integrity of the WL across migrations and makes it easier for validations and verifications to prevent potential tampering.

Compression: Represents if the WL is compressed or not.

Compression type: Indicates the type of compression algorithm applied.

Next: Indicates whether there is another attestation available in the payload. There may be a limit of the number of attestations that can be appended to the payload obtained across various nodes or the controlling server; the limit may be dictated by the standards group. Examples discussed herein may use a limit of 512 chained attestations.

Based on the stamp that is generated, the WL is verified against a node policy for compliance of WL execution (decision operation 122). Then, the WL is either allowed to run (operation 124) or blocked (rejected) at the destination (operation 126).

Next, the stamp 106 that is generated at the destination node is delivered to the source node (operation 128). Further, the stamp 106 received by the source node may be entitled to be utilized as a payload (schema) with the WLs metadata. This may be used for later deployment requests that the source node may have with other nodes in the C2E topology.

Decentralized Case #2: Migration of WL with Prior Attestations from Source to Destination, where WL Attestation that Happens at Destination Gets Appended to the Stamp.

Figure 1B:
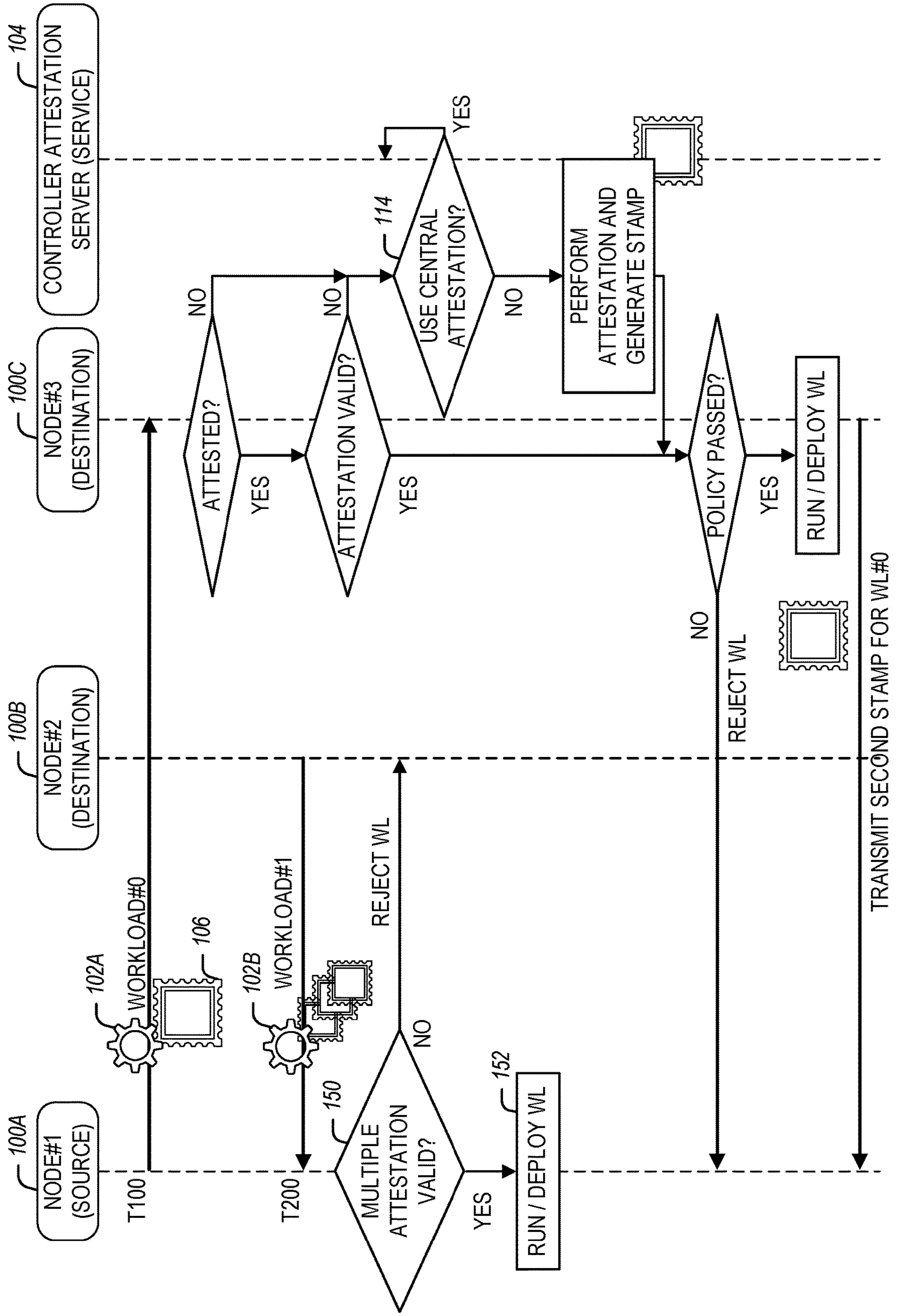

Aligning to the discussion above, continuing in the depiction of FIG. 1B, at time t100, node #1 100A initiates a request to run the same workload WL #0 102A on node #3 100C and therefore node #1 100A sends WL #0 102A this time with the stamp 106 it had received from previous execution at t0 on node #2 100B.

The stamp 106 that is attached with WL #0 102A at t100 from node #1 100A is termed as payload for the workload WL #0 102A and this time an encryption status and type is attached with the payload. The encryption status and type indicates that the WL #0 102A may be encrypted at its source when it is dispatched to its destination. The payload is generally referred to as WL "metadata."

Figure 3:
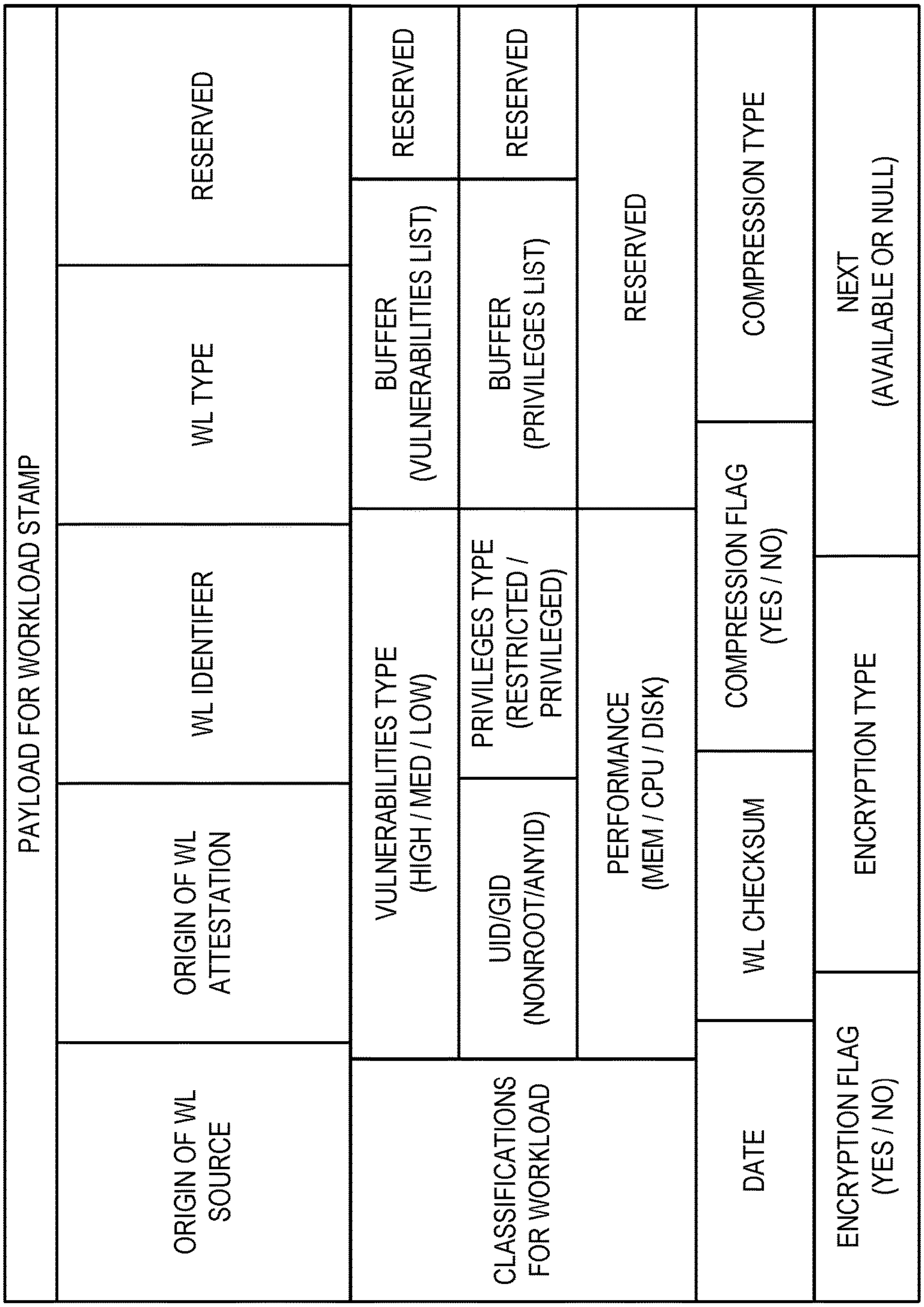
FIG. 3 illustrates payload specifications for a workload, according to an example.

A pictorial representation of the payload is shown in FIG. 3. The payload includes an additional field indicating the encryption data comprising of two fields: Encryption and Encryption Type.

Encryption: Represents if the WL is encrypted or not.

Encryption Type: Indicates the type of encryption algorithm applied.

At the destination node (e.g., node #3 100C) the payload is trimmed off its encryption details and verified for acceptance. Once again, all the operations discussed earlier may be repeated and this time the stamp generated may be appended to the previously received stamp through the payload from source thereby marking field <Next> with the first stamp as available and the <Next> in the appended stamp as NULL.

A conditional check is made to check if the attestation is to be made by the destination node (e.g., worker node/consumer) or by the controller attestation node 104. This type of check may be used by any receiving node.

Decentralized Case #3: Migration of WL with More than One Attestation while the WL is Subjected to Run at the Consuming Node without any Attestation by Itself.

At time t200, as depicted in FIG. 1B, there may be a workload WL #1 102B that arrives at a destination node (node #1 100A) from a source node (node #2 100B). By time t200, the WL #1 102B may be attested by one or more nodes and may carry a payload with multiple attestations.

Following the receipt of WL #1 102B with multiple attestations, the node policy may verify the workload WL #1 102B for multiple attestation and if attested by at least two nodes (operation 150), it may allow execution of the WL (operation 152). Here it may be noted that generation of the stamp at the destination node is optional based on node policy for acceptance or rejection.

Decentralized Case #4: Migration of WL with Attestation by the Source Via Controlling Attestation Server (Service).

Figure 1C:
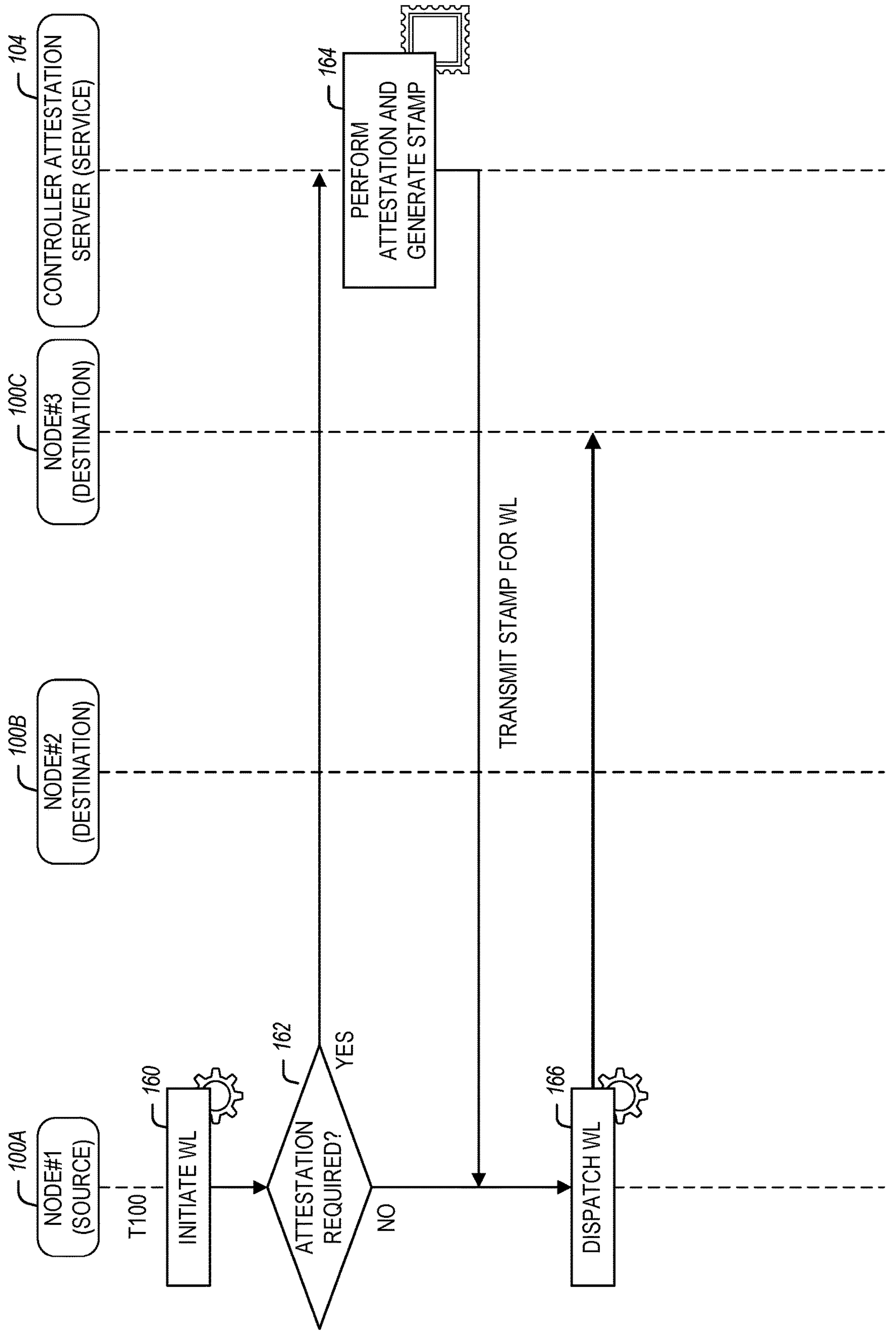

Next at time t300, depicted in FIG. 1C, there is a WL (WL #3 102C) initiated from source node (node #1 100A) with no prior attestations (operation 160). The source node may be configured to send the workload to one of the destination nodes along with an attestation. In this example, attestation from the source itself may not be honored by the destination (consumer) node and therefore the source node needs to rely on a third party for attestation. So, the controller attestation node 104 (service) is useful here for assistance.

The source node sends the WL (WL #3 102C) to the controlling attestation server for attestation (operation 162). The controlling attestation server performs attestation and generates a stamp (operation 164). Once the stamp is received, the source node may henceforth be able to dispatch the WL with the attestation metadata (operation 166). The controlling attestation server can be centric to a cluster or in a federated mode across clusters.

Decentralized Case #5: Denial of Service Attack

There may be a hacker who may create nodes in the cluster or a group of clusters that may pretend to generate authentic attestations. This may cause a "Denial of Service Attack" for the consumer node and the cluster itself. To prevent such a situation, a node can set its compute security policy to run WLs only if attested by one or more controlling attestation servers (services).

Decentralized Case #6: Trust Boundary

The WLs migrate with attestations across the C2E boundaries, and it is completely under the control of the destination node to consume the WL for deployment based on the node policy for acceptance or rejection of execution. However, there may be a node policy that dictates consumption of the WL only with fresh attestation on arrival due to crossing of the boundary. This means that the receiving node is willing to accept attestations on the WL if and only if it comes from private clusters and not from the outside world. Attestations may be limited to a certain scope, such as within a network, within a network provider, within a subdomain, or within a namespace. The scope may be geographical or political boundaries, such as an attestation that is valid only within computers physically located in the borders of the European Union or under control of the U.S. government or is located exclusively in a particular state or jurisdiction (e.g., state-level privacy laws may differ in the U.S.).

Decentralized Case #7: New CVE Identified Recently, after Attestation

Generally, the WL attestation as described in previous cases are either made at the destination node or by the controller node before or at the time of consumption for deployment. With such a model there is a very small chance that a very recently-identified vulnerability goes undetected prior to deployments. To avoid such a situation, it is recommended that the destination node and the controlling attestation server is alerted of the most recent Common Vulnerabilities and Exposures (CVE) report and WL subjected to re-attestation. Alternatively, if a new CVE report is identified post attestation, then the WL may be quarantined for fresh attestation.

Decentralized Case #8: New CVE Identified Recently, after Attestation

An insider attack is a compute security crisis where a known trusted node inside the cluster itself becomes compromised to hack and starts generating fake unauthentic attestations. This can happen with the controlling attestation server as well. To guarantee that the WLs are not opaquely accepted for consumption a series of attestations by peers and by various other controlling attestation servers may be used. This may occur as the consistency of attestations play a bigger role for trust establishment.

Decentralized Architecture—with Container Deployment

As an alternative way of migrating the WL with payloads, there may be a Kubernetes orchestration-based implementation for Container-based workloads that migrate across nodes in the C2E spectrum. All the decentralized cases discussed above are applicable here as well.

Figure 4:
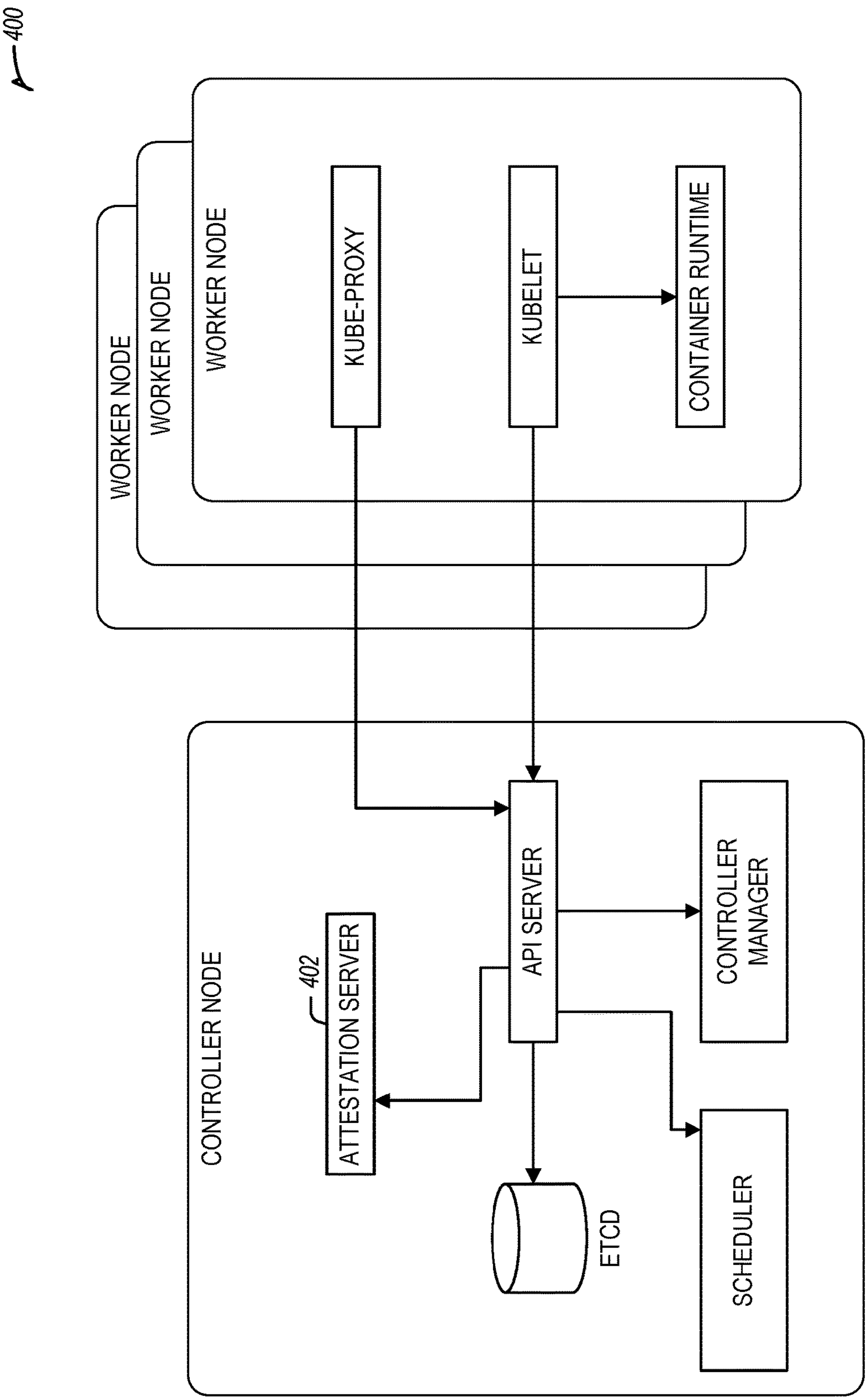
FIG. 4 illustrates a container architecture with an enhanced attestation server for trust establishment, according to an example.

FIG. 4 provides a pictorial representation of the Kubernetes architecture 400 with an enhanced attestation server 402 for trust establishment. The enhancement includes an attestation server 402 connected to the Kubernetes orchestration in the form of a service that may perform various operations of compute security checks including: i) analysis of the container for its layers and ingredients; ii) perform classification of the container based on analysis, where the classification can be performed as discussed earlier with respect to vulnerabilities detected, privileges and permissions required to run the same, etc.; and iii) stamp or attest the image based on the analysis.

Figure 5:
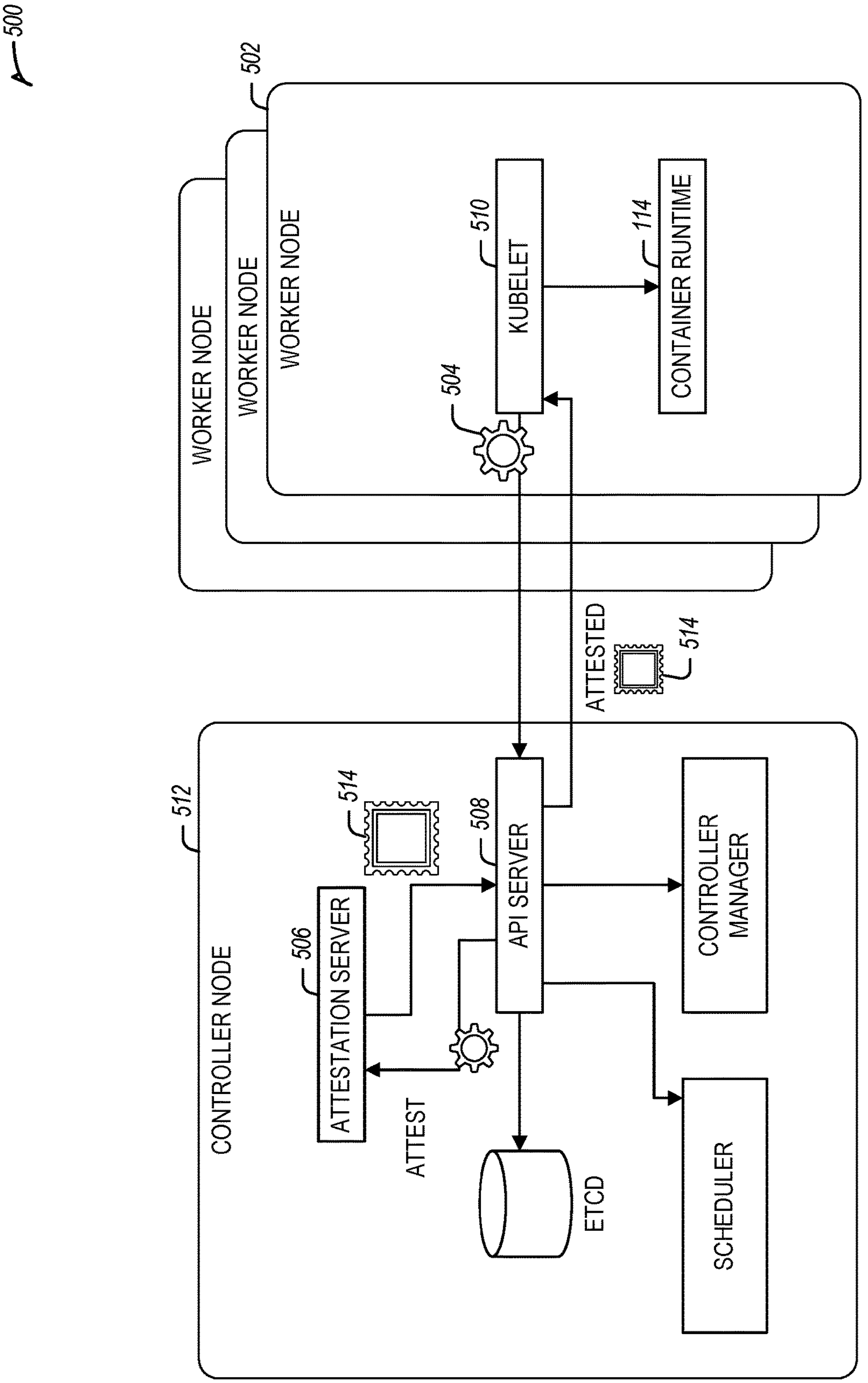
FIG. 5 illustrates an attestation workflow across a container architecture, according to an example.

A simple workflow of attestation request is shown in FIG. 5. A high-level overview of the flow 500 is as discussed here.

a) A worker node (source) 502 which may want to run a workload 504 on another worker node (destination) gets the workload 504 attested by the Kubernetes (k8s) controller service 506 by placing the request to the k8s API server 508 via kubelet 510 in the k8s environment. It is understood that other container deployment systems besides Kubernetes may be used.
b) The k8s API server 508 may in turn reach out to the k8s attestation server 506 in the controller node 512.
c) The attestation server 506 may have tools and frameworks to perform forensics on the container image of the workload 504 and once analysis is complete, a stamp 514 is generated. There can be replicas of attestation server hosting the tools and an attestation service that may perform parsing of metadata obtained from the analysis.
d) The stamp 514 is delivered to the requestor via the API server 508 for future use.
e) The stamp 514 that is received by the requestor is attached with the deployment requests henceforth in the YAMLs.

The block shown in Table 1 below marked as "trust" can be a form of an attestation schema that may be attached with the k8s YAMLs on deployments or pod definitions. The following provides an example schema with attestation in Kubernetes YAML:

TABLE 1

```
apiVersion: apps/v1
kind: Deployment
metadata:
  name: postgres
spec:
  selector:
  matchLabels:
    app: postgres
  template:
  metadata:
    labels:
    app: postgres
  spec:
```

TABLE 1-continued

```
      containers:
      - name: postgres
        image: postgres
        ports:
        - containerPort: 5432
        env:
        - name: POSTGRES_DB
          value: mydatabase # an explicit env var value
        - name: POSTGRES_USER
          valueFrom:
          configMapKeyRef: # populate from a ConfigMap
            name: postgres-config # ... with this name
            key: my.username # ... and look for this key
        - name: POSTGRES_PASSWORD
          valueFrom:
          secretKeyRef: # populate from a Secret
            name: postgres-secret # ... with this name
            key: secret.password # ... and look for this key
        #Attestation made for the container
        trust:
        # Originally attested by IP address. Generally, this will be the k8s controller
attestation service.
        - originAttested: 192.168.1.6
                # The original source from where the WL has been initiated for
              deployment.
        originSource: 192.168.68.106
        # Based on a digest/hash value.
                Identifier: 95b251e0c938fcbd2137888575ecd325e2b4dce7
                # Generally, the type is docker image.
                type: "dockerImage"
        # The date on which the attestation was made.
                dateAttested: "2022-06-20"
        # Based on MD5
                checksum:3797e8cdfda7ada234b68d8ce67fd284
        # Indicates state of image compression. By default, it is uncompressed and
optional.
                Compression
                    - state: 1
                      algorithm: ["LZ4"]
        # Multiple parameters on classification of the container for trust
attestation.
                Classification:
          # Classification on CVEs in a range of high, medium, and low.
                    - vulnerabilities:
            # Indicates 3 high rated vulnerabilities prevail in the image.
                      high: 3
                      # Vulnerabilities listed as detected.
                      highVuls: ["CVE-2017-1002101", "CVE-2019-16884", "CVE-
2019-11249"]
                      medium: 0
                      mediumVuls: ["none"]
                      low:0
                      lowVuls: ["None"]
                    # Privileges / capabilities required for the container to run are
                    indicated.
                    - privileges:
                      # 1 if restricted, 0 if privileged
                      restricted: 0
                      privList: ["cap_chown", "cap_dac_override", "cap_setuid",
"cap_net_bind_service"]
                    - permissions:
                      runAsAny: 0
```

Each container image in the YAML may have a trust and attestation section which dictates the trustworthiness of the image. The combined trust of the WL comprising of multiple container images in the YAML, or package including HELM charts or Docker Compose files, can provide a cumulative summary of the trust reported across each container image.

The deployment YAML is subject to parsing at the receiving/destination node in the k8s cluster. Validation of the new trust objects are handled by the API server while the attestation service may also assist the k8s API server in processing the attestations for deployments based on node policy. In Kubernetes installations, etcd is a consistent and highly available key value store used as Kubernetes' backing store for all cluster data. Additionally, similar to etcd, key:value pairs may be stored by the Kubernetes master/control plane to hold the information on the attested container images. Because attestations are sensitive information, it is important that they are maintained in a tamper free and protected environment. Although key:value pairs are demonstrated using the YAML language, it is understood that other serialization formats may be used, such as JavaScript Object Notation (JSON).

Figure 6:
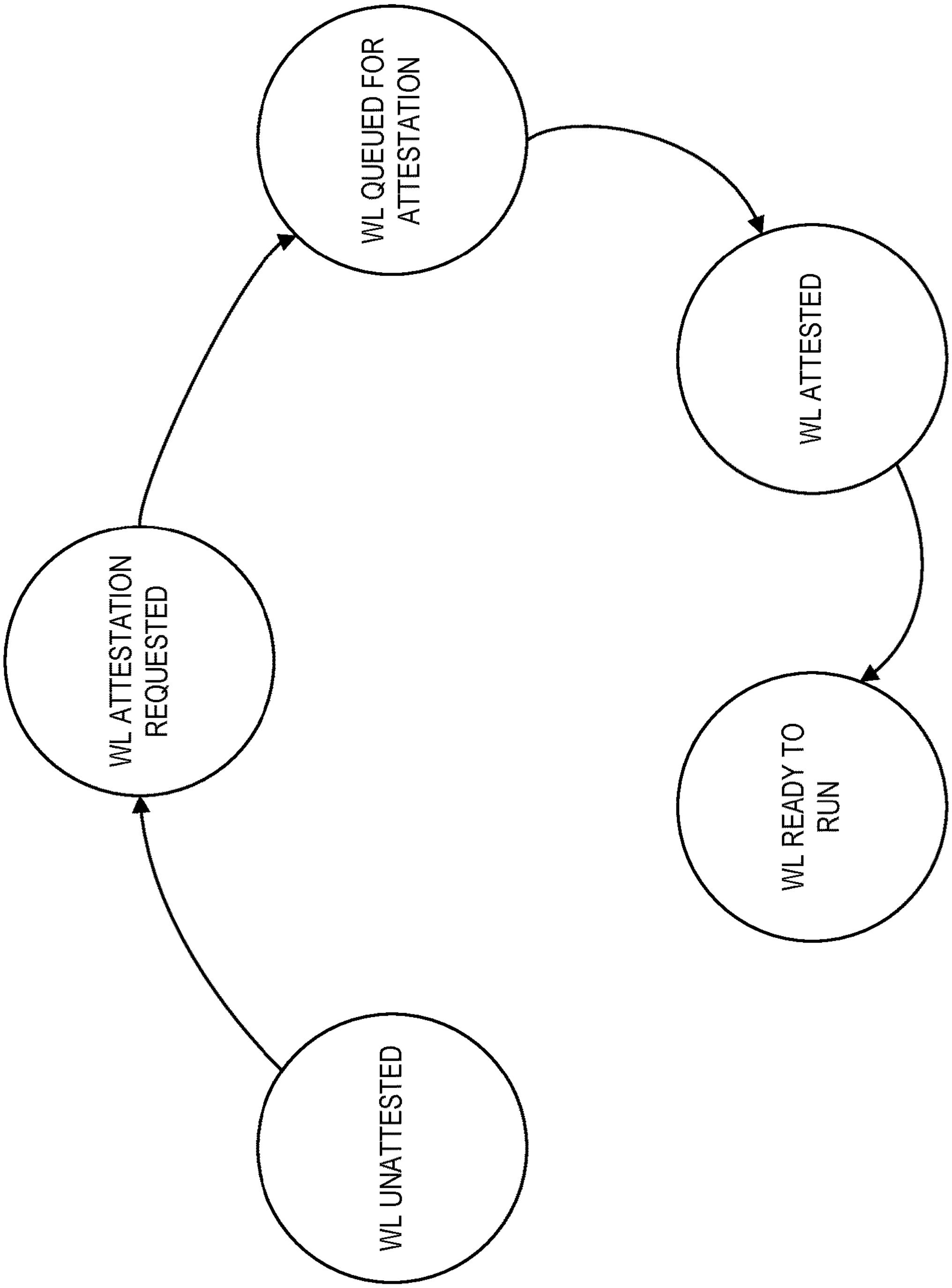
FIG. 6 illustrates a state diagram of workload attestation and deployment, according to an example.

With respect to the decentralized attestation case, FIG. 6 depicts a state diagram of WL attestation and deployment. Overall, every node in the network topology agrees upon to allow WL migration on the given consensus and protocol for highest compute or data security. The WLs therefore migrate with attestations and therefore exhibit zero trust in C2E spectrum.

Centralized Trust Architecture

As ecosystems and workloads become more complex, entities are looking at the Cloud to Edge (C2E) to meet complex business needs. Applications such as autonomous driving, smart cities, and telemedicine are characterized by their handling of large volumes of sensor data, with varying latency and compute/communication security needs. Workloads follow data and need to be able to intelligently move across the C2E continuum of compute nodes, which is more than just cloud plus edge, seeking ideal environments. The following architecture aims to provide another framework to the rising needs for smart orchestration of compute security-aware workloads in bidirectional paths.

As noted above, workloads move from edge to cloud and vice versa in cross cluster environment today seamlessly but without the trust. This calls upon the need to introduce the novel trust factor to orchestration. Until today solutions and fragmented capabilities were provided to the customers, developers, and integrators in a tailored fashion. However, with growing size of C2E workflows this inconsistency needs to be stitched together to arrive at a common solution and platform so that the end users can develop and deploy WLs anywhere, anytime.

The following introduces a framework for centralized trust model over migration of cyber aware WLs across the C2E environment with immutable and verifiable attestations.

Figure 7A:
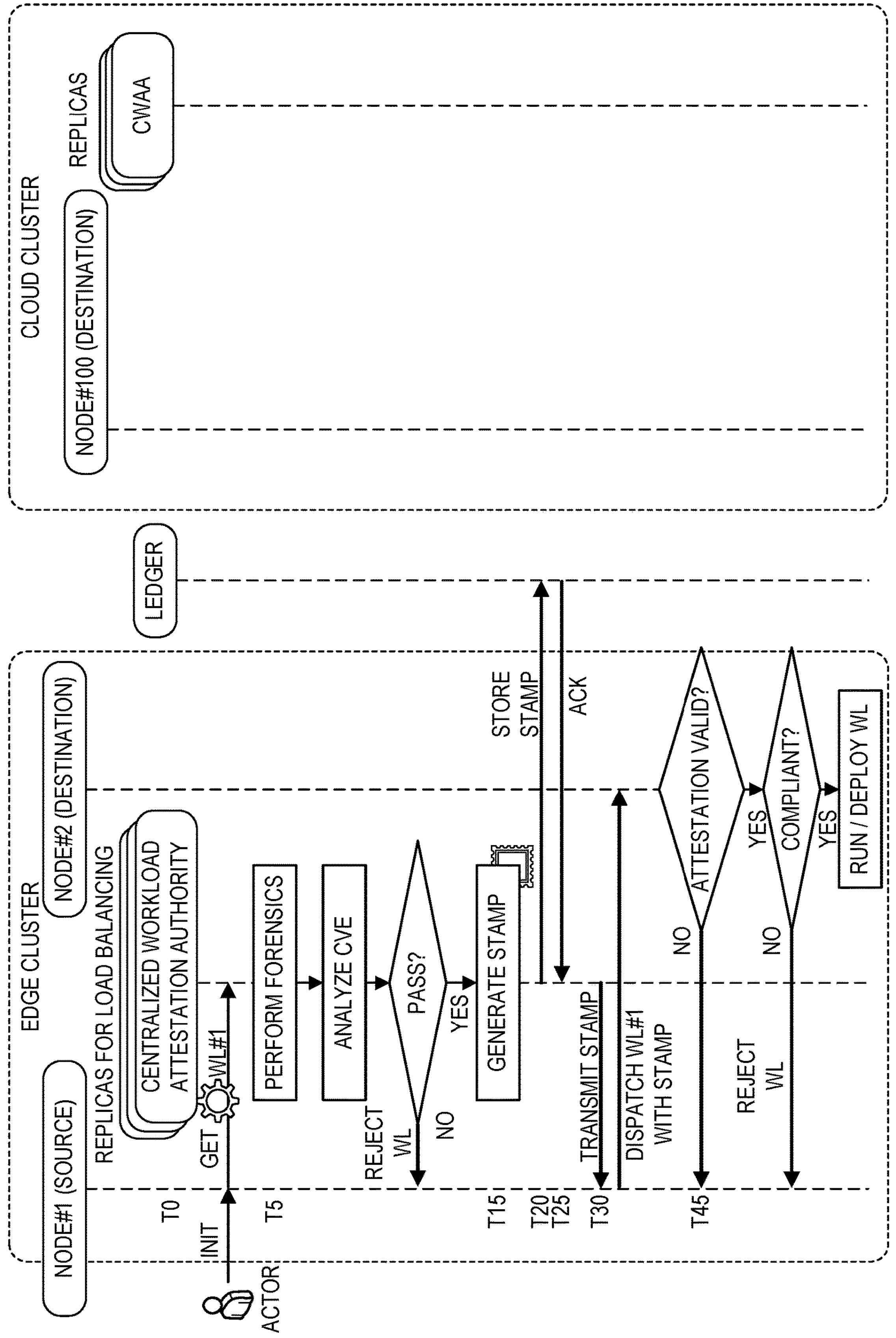
FIGS. 7A to 7B illustrate a centralized architecture for cloud-to-edge trust establishment of workloads, according to an example.
Figure 7B:
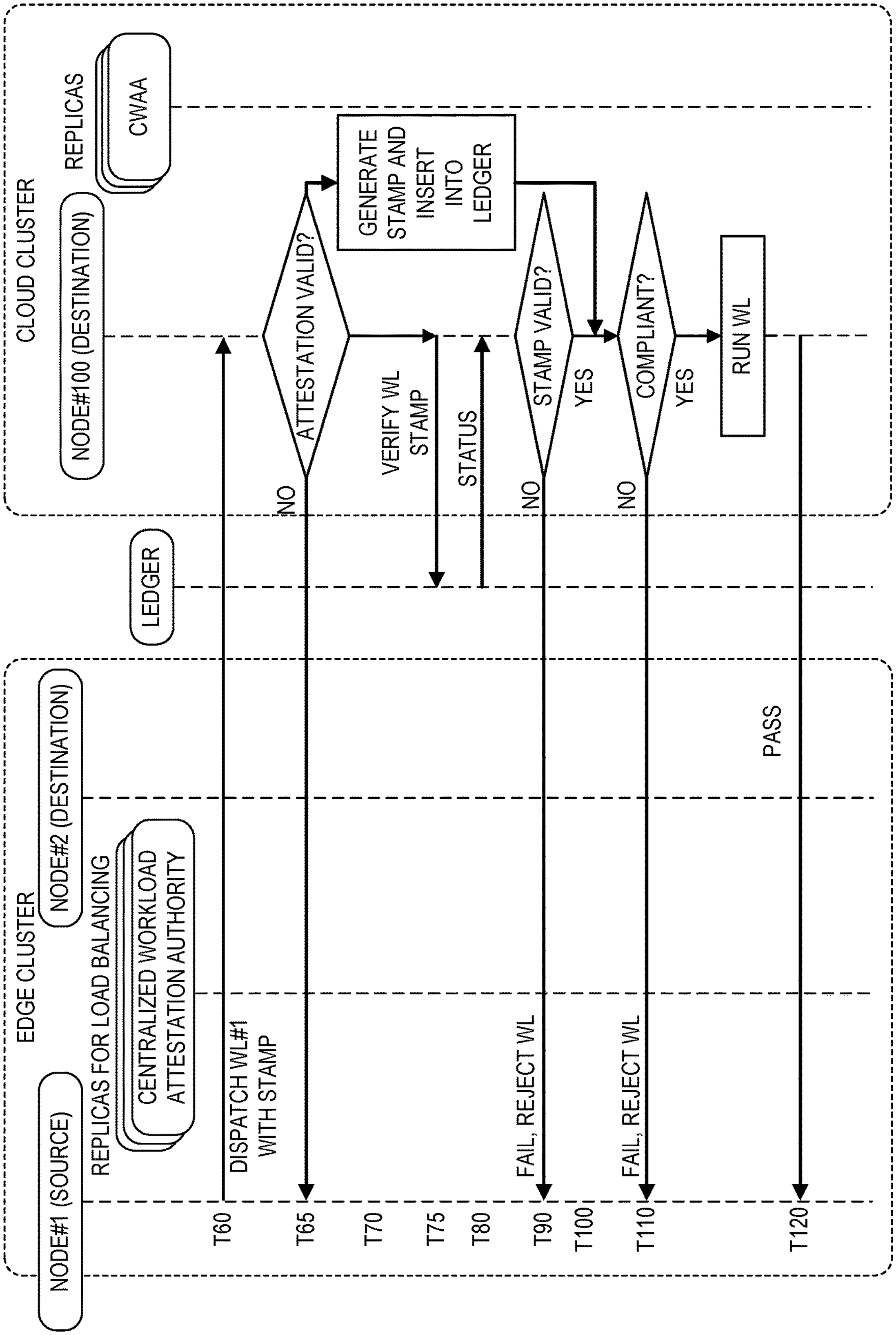

FIGS. 7A and 7B depict a C2E environment, providing an Architecture for Centralized Cloud-to-Edge trust establishment of workloads, including clusters. On the left is the Edge Cluster and on the right is the cloud cluster across the boundary. There are two participating nodes (as an example), node #1 and node #2 along with a centralized attestation server in its control plane inside an edge cluster. In the cloud cluster, there is one node (node #100) and a centralized attestation server.

Any node in the C2E topology can be source or destination at any point of time. A source node is the one from where the WL is originated and destination node is where the WL is received for execution or deployment. The central attestation node is the one that provides attestation service in various models to all its consumers (seekers).

Various models included for centralized attestation are as follows:

A) Attestation by the attestation service in the controller (leader) node within the control plane.

B) Attestation by the assisting attestation service in special assisting nodes of extended control plane.

C) Attestation made by one of the control planes in the multi-cluster environment.

D) Attestation by the attestation service in the controller host control plane which is leader/controller of control planes.

E) Attestation by the attestation service in the control plane of virtual cluster.

It may be noted that there can be replicas of the controller attestation node within the cluster or across the clusters.

Centralized Case (1): Destination Node does not Perform Verification of Attestation.

Every node that wants to run or migrate the WL to another node for deployment may have the WL attested by the centralized attestation service. So, in the pictorial representation of FIGS. 7A and 7B at time, t0 we have workload WL #1, initiated from node #1 for attestation by the centralized workload attestation authority (CWAA) server, and then sent to node #2 in the same edge cluster for execution.

At time t5, the CWAA (server or service) may perform integrity and security checks for workload forensics using various tools and frameworks. Most or all significant code paths of the WL execution are attempted for analysis by the CWAA server and code coverage percent is reported.

Based on forensics, the privilege set, CVEs (e.g., vulnerabilities), and performance and system calls are captured with respective classifications. The classifications can be high, medium, low for CVEs along with the list of CVEs, restricted or privileged for the privilege set, followed by the system calls used by the WL.

At time t15, a stamp with metadata including but not limited to origin of a WL, classification of a WL based on various parameters including privileges, CVE information, system calls, and performance is generated. Further, the WL is placed in the registry for future reference.

At time t20, the stamp is placed in immutable ledger (e.g., blockchain) to ensure that the attestation is tamper free. The immutable ledger sends acknowledgement (ACK) to the sender at time t25. At time t30, on receiving ACK from the immutable ledger at the centralized attestation server, the stamp is passed to the initiating source, node #1. These values are captured and passed onto the initiating node in some format.

At time t40, the node #1 dispatches the workload (WL #1) to the destination node (node #2) with the attestation it has received earlier embedded in the dispatch.

At time t45, destination node (node #2) continues to process the WL #1 for compliance checks using the attestation received for the workload without performing verification on the attestation. This outcome means that node #2 is willing to trust the attestation it has received and will not regenerate fresh attestation. Further, the WL is subjected to checks for integrity and compliance leading to rejection or approval of the run at node #2. On completion the status of execution and results are returned appropriately.

Centralized Case (2): Destination Node Performs Verification of Attestation.

At time t60, WL #1 is sent from source node #1 to destination node node #100 in the cloud cluster. The destination node is configured to verify the attestation it has received for the workload from an edge cluster and therefore it sends a verification request to the immutable ledger at time t75.

At time t80, once the verification is complete the status is sent to the requestor node #1 in cloud cluster. If the stamp is not valid, then at time t90, the process fails, and the workload is rejected. After receiving the verification status by node #2 at time t100, the process continues with checks for compliance across the node's compute security policy. Based on the policy, the WL is allowed to run or is rejected for deployment. If the policy compliance check fails, then at time t110, the process fails, and the workload is rejected. At time t120, when the WL run is complete, the results are sent to the source node (node #1).

Centralized Case (3): Attestation in Multi-Cluster Environment

Multi-cluster (MC) deployments of applications can be achieved by connecting the various clusters together at the network layer and then deploying the relevant applications in each cluster. Each cluster may have its own control plane and with this aspect there may be an attestation server/service embedded with them. The attestations for the WLs can be achieved from the invokers of their own leader control plane. Alternatively, the attestation server in each control plane can be optional and there can be only one or few attestation servers addressing the purpose in the MC environment.

Centralized Case (4): Attestation Made by Leader of Controller (Master) Control Plane.

With this aspect, the controller host cluster (which controls a group of clusters) has a leader of the controller control plane that may pick up the responsibility of generating trust attestations for all the clusters under its topology.

Centralized Case (5): Implicit Verification of Attestation at the Destination.

Location of the classification, trust metadata, or attestation can be on a centralized repository (e.g., GitHub). The WL can be dispatched with trust attestation pointing to this location as well instead of carrying the trust data within itself. The destination, on receiving the WL, can simply retrieve the trust details from the repository (e.g., via the immutable ledger) or from a remote location in which case verification becomes implicit.

Figure 8:
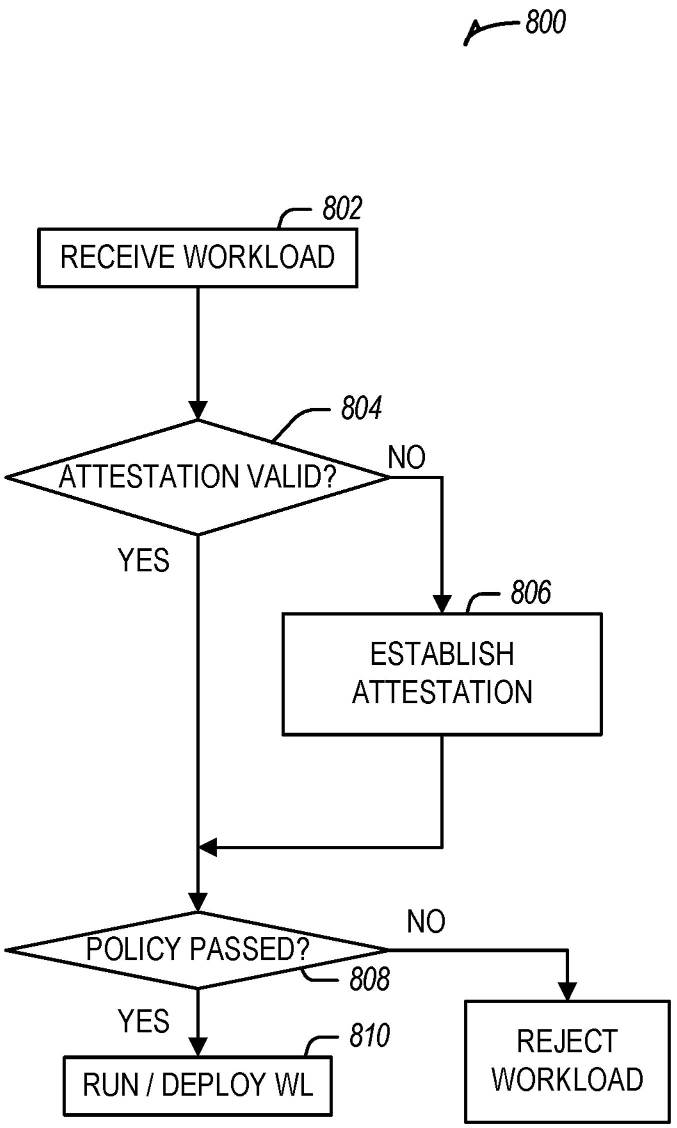
FIG. 8 is a flowchart illustrating a method for implementing attestation operations, according to an example.

FIG. 8 is a flowchart illustrating a method 800 for implementing attestation operations, according to an example. The method 800 may be performed by a device, such as a computing device, a network appliance, a compute node, an edge node, a compute node 1400, or an Edge computing node 1450.

At 802, a workload is received as part of a workload migration process, from a source computing device over a network shared with the computing device. In an embodiment, the computing device is a centralized computing device that is designated as an attestation server for multiple computing devices in the network. The workload migration process may be to migrate the workload from a cloud device to an edge device, or from an edge device to a cloud device.

In an embodiment, the source computing device is in the same network cluster as the computing device. In another embodiment, the source computing device is in a different network cluster from the computing device.

At 804, it is determined whether the workload has valid attestation. In an embodiment, determining whether the workload has valid attestation includes verifying the attestation with a centralized attestation service.

In an embodiment, determining whether the workload has valid attestation includes verifying the attestation by querying an immutable ledger.

At 806, attestation is established for the workload when the workload does not have valid attestation. In an embodiment, establishing attestation for the workload includes performing forensic analysis on the workload, classifying the workload to produce a workload classification, and generating an attestation stamp for the workload, wherein the attestation stamp includes details of the forensic analysis and the workload classification.

In an embodiment, the attestation stamp is stored in a standardized language. In a further embodiment, the standardized language is YAML. In another embodiment, the standardized language is JavaScript Object Notation (JSON).

In an embodiment, establishing attestation for the workload includes generating an attestation stamp and storing the attestation stamp in an immutable ledger. In a further embodiment, the immutable ledger is a blockchain.

At 808, it is determined whether the attestation is compliant with a policy. In an embodiment, the policy includes requirements related to one or more of: a requirement of the workload to have a certain security profile, a requirement that the workload have multiple attestations, a requirement that the workload have a new attestation created when crossing a network boundary, a requirement that the workload be locally attested, or a requirement that the workload be attested by a central controlling node.

At 810, the workload is executed when the attestation is compliant with the policy.

In an embodiment, the method 800 includes analyzing a common vulnerabilities and exposures (CVE) report to determine whether the workload has likely been infected with a vulnerability and invalidating the attestation of the workload when the workload has likely been infected with the vulnerability.

Example Edge Computing Architectures

Although the previous discussion was provided with reference to specific networked compute deployments, it will be understood that the Trust as a Service (TaaS) instances may be implemented at any number of devices that access services from the "cloud", devices that access services from the "edge cloud", or devices that access services from the "data center cloud". In particular, for edge devices to successfully access any services in the edge cloud, the edge device has to be attested as secure.

Accordingly, the present techniques provide a framework to enable attestation of the compute security features of the edge before services are fulfilled at the edge. Further, the present techniques provide a continuum of verification, from data center to cloud to edge.

Figure 9:
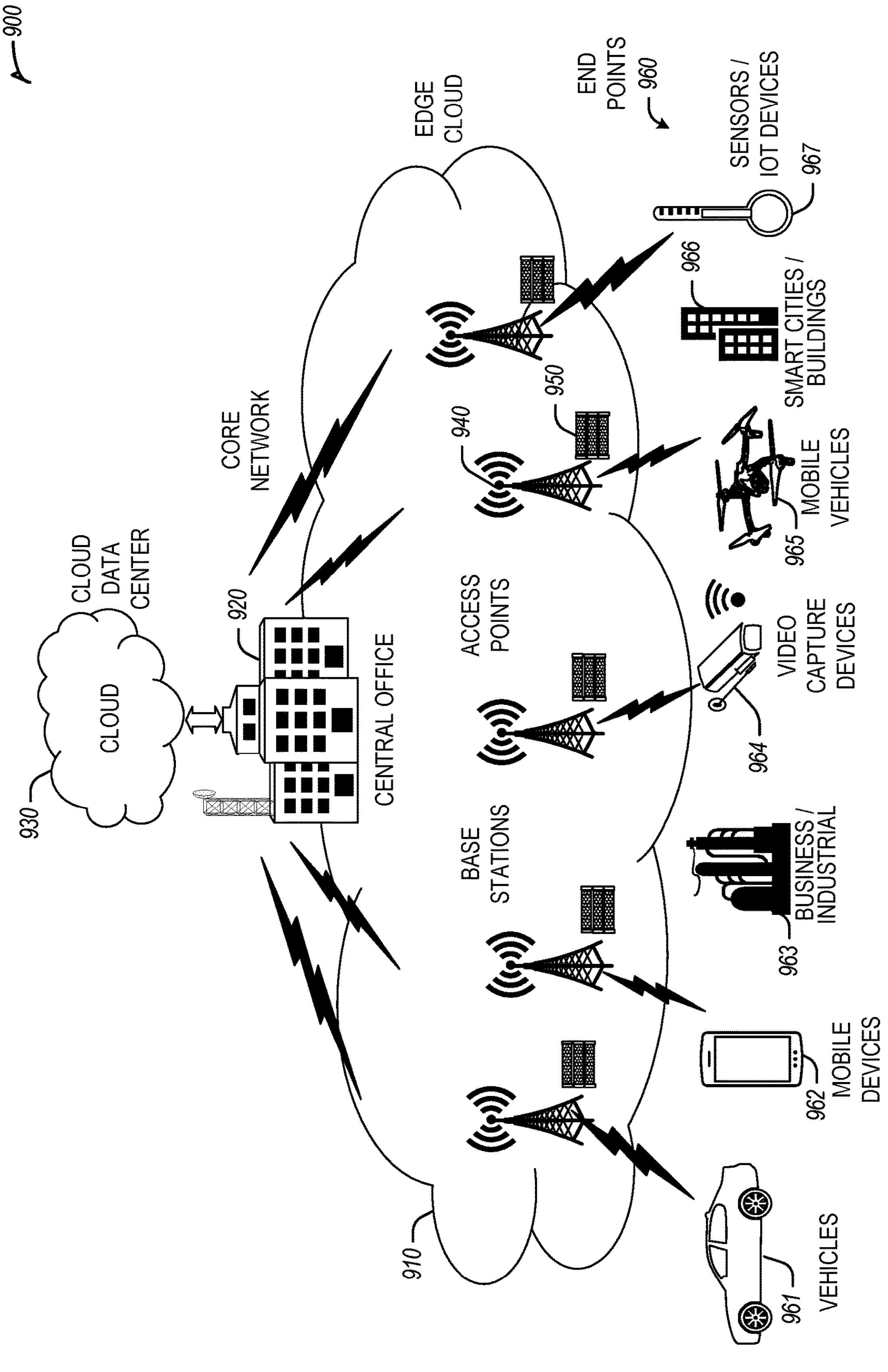
FIG. 9 illustrates an overview of an edge cloud configuration for edge computing, according to an example.

FIG. 9 is a block diagram 900 showing an overview of a configuration for edge computing, which includes a layer of processing referenced in many of the current examples as an "edge cloud". As shown, the edge cloud 910 is co-located at an edge location, such as an access point or base station 940, a local processing hub 950, or a central office 920, and thus may include multiple entities, devices, and equipment instances. The edge cloud 910 is located much closer to the endpoint (consumer and producer) data sources 960 (e.g., autonomous vehicles 961, user equipment 962, business and industrial equipment 963, video capture devices 964, mobile vehicles (e.g., drones) 965, smart cities and building devices 966, sensors and IoT devices 967, etc.) than the cloud data center 930. Compute, memory, and storage resources which are offered at the edges in the edge cloud 910 are critical to providing ultra-low latency response times for services and functions used by the endpoint data sources 960 as well as reduce network backhaul traffic from the edge cloud 910 toward cloud data center 930 thus improving energy consumption and overall network usages among other benefits.

Compute, memory, and storage are scarce resources, and generally, decrease depending on the edge location (e.g., fewer processing resources being available at consumer end point devices than at a base station or at a central office). However, the closer that the edge location is to the endpoint (e.g., UEs), the more that space and power are constrained. Thus, edge computing, as a general design principle, attempts to minimize the resources needed for network services, through the distribution of more resources which are located closer both geographically and in-network access time. In this manner, edge computing attempts to bring the compute resources to the workload data where appropriate, or bring the workload data to the compute resources.

The following describes aspects of an edge cloud architecture that covers multiple potential deployments and addresses restrictions that some network operators or service providers may have in their own infrastructures. These include, variation of configurations based on the edge location (because edges at a base station level, for instance, may have more constrained performance and capabilities in a multi-tenant scenario); configurations based on the type of compute, memory, storage, fabric, acceleration, or like resources available to edge locations, tiers of locations, or groups of locations; the service, security, and management and orchestration capabilities; and related objectives to achieve usability and performance of end services. These deployments may accomplish processing in network layers that may be considered as "near edge", "close edge", "local edge", "middle edge", or "far edge" layers, depending on latency, distance, and timing characteristics.

Edge computing is a developing paradigm where computing is performed at or closer to the "edge" of a network, typically through the use of a compute platform (e.g., x86, AMD or ARM hardware architectures) implemented at base stations, gateways, network routers, or other devices which are much closer to end point devices producing and consuming the data. For example, edge gateway servers may be equipped with pools of memory and storage resources to perform computation in real-time for low latency use-cases (e.g., autonomous driving or video surveillance) for connected client devices. Or as an example, base stations may be augmented with compute and acceleration resources to directly process service workloads for connected user equipment, without further communicating data via backhaul networks. Or as another example, central office network management hardware may be replaced with compute hardware that performs virtualized network functions and offers compute resources for the execution of services and consumer functions for connected devices. Within edge computing networks, there may be scenarios in services in which the compute resource will be "moved" to the data, as well as scenarios in which the data will be "moved" to the compute resource. Or as an example, base station compute, acceleration and network resources can provide services to scale to workload demands on an as-needed basis by activating dormant capacity (subscription, capacity-on-demand) to manage corner cases, emergencies or to provide longevity for deployed resources over a significantly longer implemented lifecycle.

In contrast to the network architecture of FIG. 9, traditional endpoint (e.g., UE, vehicle-to-vehicle (V2V), vehicle-to-everything (V2X), etc.) applications are reliant on local device or remote cloud data storage and processing to exchange and coordinate information. A cloud data arrangement allows for long-term data collection and storage but is not optimal for highly time-varying data, such as a collision, traffic light change, etc. and may fail in attempting to meet latency challenges.

Depending on the real-time requirements in a communications context, a hierarchical structure of data processing and storage nodes may be defined in an edge computing deployment. For example, such a deployment may include local ultra-low-latency processing, regional storage, and processing as well as remote cloud datacenter-based storage and processing. Key performance indicators (KPIs) may be used to identify where sensor data is best transferred and where it is processed or stored. This typically depends on the ISO layer dependency of the data. For example, lower layer (PHY, MAC, routing, etc.) data typically changes quickly and is better handled locally to meet latency requirements. Higher layer data such as Application-Layer data is typically less time-critical and may be stored and processed in a remote cloud datacenter.

Figure 10:
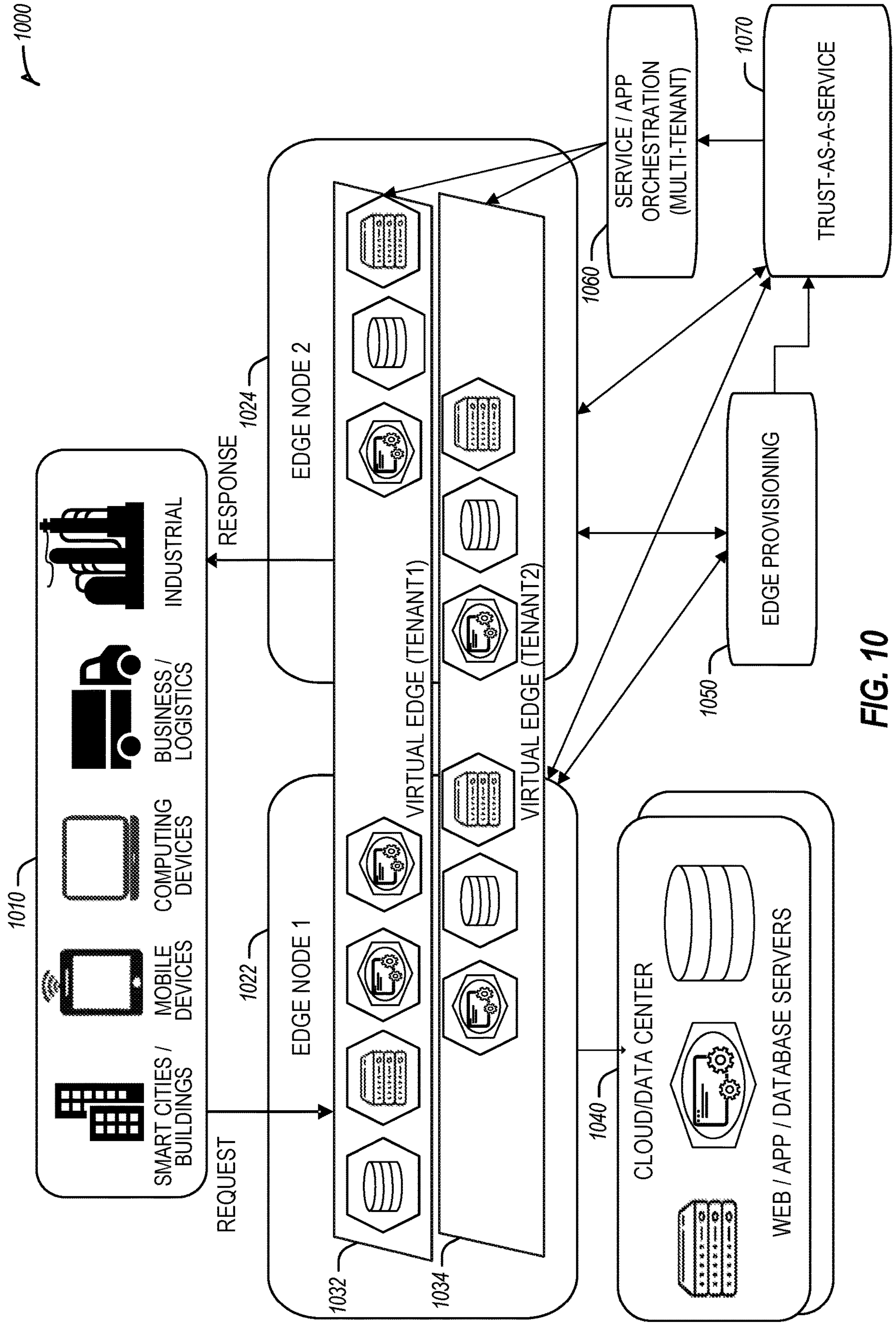
FIG. 10 illustrates deployment and orchestration for virtual edge configurations across an edge-computing system operated among multiple edge nodes and multiple tenants, according to an example.

FIG. 10 illustrates deployment and orchestration for virtual edge configurations across an edge computing system operated among multiple edge nodes and multiple tenants. Specifically, FIG. 10 depicts coordination of a first edge node 1022 and a second edge node 1024 in an edge computing system 1000, to fulfill requests and responses for various client endpoints 1010 (e.g., smart cities/building systems, mobile devices, computing devices, business/logistics systems, industrial systems, etc.), which access various virtual edge instances. The virtual edge instances 232, 234 (or virtual edges) provide edge compute capabilities and processing in an edge cloud, with access to a cloud/data center 1040 for higher-latency requests for websites, applications, database servers, etc. Thus, the edge cloud enables coordination of processing among multiple edge nodes for multiple tenants or entities.

In the example of FIG. 10, these virtual edge instances include a first virtual edge 1032, offered to a first tenant (Tenant 1), which offers a first combination of edge storage, computing, and services; and a second virtual edge 1034, offering a second combination of edge storage, computing, and services, to a second tenant (Tenant 2). The virtual edge instances 1032, 1034 are distributed among the edge nodes 1022, 1024, and may include scenarios in which a request and response are fulfilled from the same or different edge nodes. The configuration of each edge node 1022, 1024 to operate in a distributed yet coordinated fashion occurs based on edge provisioning functions 1050. The functionality of the edge nodes 1022, 1024 to provide coordinated operation for applications and services, among multiple tenants, occurs based on orchestration functions 1060.

It should be understood that some of the devices in 1010 are multi-tenant devices where Tenant1 may function within a Tenant1 'slice' while a Tenant2 may function within a Tenant2 'slice' (and, in further examples, additional or sub-tenants may exist; and each tenant may even be specifically entitled and transactionally tied to a specific set of features all the way to specific hardware features). A trusted multi-tenant device may further contain a tenant-specific cryptographic key such that the combination of a key and a slice may be considered a "root of trust" (RoT) or tenant-specific RoT. A RoT may further be computed dynamically composed using a compute security architecture, such as a DICE (Device Identity Composition Engine) architecture where a DICE hardware building block is used to construct layered trusted computing base contexts for secured and authenticated layering of device capabilities (such as with use of a Field Programmable Gate Array (FPGA)). The RoT also may be used for a trusted computing context to support respective tenant operations, etc. Use of this RoT and the compute security architecture may be enhanced by the attestation operations further discussed herein.

Edge computing nodes may partition resources (memory, central processing unit (CPU), graphics processing unit (GPU), interrupt controller, input/output (I/O) controller, memory controller, bus controller, etc.) where respective partitions may contain a RoT capability and where fan-out and layering according to a DICE model may further be applied to Edge Nodes. Cloud computing nodes consisting of containers, FaaS (function as a service) engines, servlets, servers, or other computation abstraction may be partitioned according to a DICE layering and fan-out structure to support a RoT context for each. Accordingly, the respective RoTs spanning devices in 1010, 1022, and 1040 may coordinate the establishment of a distributed trusted computing base (DTCB) such that a tenant-specific virtual trusted secure channel linking all elements end-to-end can be established.

Further, it will be understood that a container may have data or workload-specific keys protecting its content from a previous edge node. As part of the migration of a container, a pod controller at a source edge node may obtain a migration key from a target edge node pod controller where the migration key is used to wrap the container-specific keys. When the container/pod is migrated to the target edge node, the unwrapping key is exposed to the pod controller that then decrypts the wrapped keys. The keys may now be used to perform operations on container specific data. The migration functions may be gated by properly attested edge nodes and pod managers (as described above).

As an example, the edge computing system may be extended to provide orchestration of multiple applications through the use of containers (a contained, deployable unit of software that provides code and needed dependencies), in a multi-owner, multi-tenant environment. A multi-tenant orchestrator may be used to perform key management, trust anchor management, and other compute security functions related to the provisioning and lifecycle of the trusted 'slice' concept in FIG. 10. An orchestrator may use a DICE layering and fan-out construction to create a root of trust context that is tenant specific. Thus, orchestration functions, provided by an orchestrator, may participate as a tenant-specific orchestration provider.

Accordingly, an edge-computing system may be configured to fulfill requests and responses for various client endpoints from multiple virtual edge instances (and, from a cloud or remote data center, not shown). The use of these virtual edge instances supports multiple tenants and multiple applications (e.g., augmented reality (AR)/virtual reality (VR), enterprise applications, content delivery, gaming, compute offload) simultaneously. Further, there may be multiple types of applications within the virtual edge instances (e.g., normal applications, latency-sensitive applications, latency-critical applications, user plane applications, networking applications, etc.). The virtual edge instances may also be spanned across systems of multiple owners at different geographic locations (or respective computing systems and resources which are co-owned or co-managed by multiple owners).

For instance, each edge node 1022, 1024 may implement the use of containers, such as with the use of a container "pod" 1026, 1028 providing a group of one or more containers. In a setting that uses one or more container pods, a pod controller or orchestrator is responsible for local control and orchestration of the containers in the pod. Various edge node resources (e.g., storage, compute, services, depicted with hexagons) provided for the respective edge slices of virtual edges 1032, 1034 are partitioned according to the needs of each container.

With the use of container pods, a pod controller oversees the partitioning and allocation of containers and resources. The pod controller receives instructions from an orchestrator (e.g., performing orchestration functions 1060) that instructs the controller on how to appropriately partition physical resources and for what duration, such as by receiving key performance indicator (KPI) targets based on SLA contracts. The pod controller determines which container requires which resources and for how long to complete the workload and satisfy the SLA. The pod controller also manages container lifecycle operations such as: creating the container, provisioning it with resources and applications, coordinating intermediate results between multiple containers working on a distributed application together, dismantling containers when workload completes, and the like. Additionally, a pod controller may serve a compute security role that prevents the assignment of resources until the right tenant authenticates or prevents provisioning of data or a workload to a container until an attestation result is satisfied.

Also, with the use of container pods, tenant boundaries can still exist but in the context of each pod of containers. If each tenant-specific pod has a tenant-specific pod controller, there may be a shared pod controller that consolidates resource allocation requests to avoid typical resource starvation situations. Further controls may be provided to ensure the attestation and trustworthiness of the pod and pod controller. For instance, the orchestrator 1060 may provision an attestation verification policy to local pod controllers that perform attestation verification. If an attestation satisfies a policy for a first tenant pod controller but not a second tenant pod controller, then the second pod may be migrated to a different edge node that does satisfy it. Alternatively, the first pod may be allowed to execute, and a different shared pod controller is installed and invoked before the second pod executing.

In further examples, edge computing systems may deploy containers in an edge computing system. As a simplified example, a container manager is adapted to launch containerized pods, functions, and functions-as-a-service instances through execution via compute nodes, or to separately execute containerized virtualized network functions through execution via compute nodes. This arrangement may be adapted for use by multiple tenants in system arrangement, where containerized pods, functions, and functions-as-a-service instances are launched within virtual machines specific to each tenant (aside from the execution of virtualized network functions).

Within the edge cloud, a first edge node 1022 (e.g., operated by a first owner) and a second edge node 1024 (e.g., operated by a second owner) may operate or respond to a container orchestrator to coordinate the execution of various applications within the virtual edge instances offered for respective tenants. For instance, the edge nodes 1022, 1024 may be coordinated based on edge provisioning functions 1050, while the operation of the various applications is coordinated with orchestration functions 1060.

Various system arrangements may provide an architecture that treats VMs, Containers, and Functions equally in terms of application composition (and resulting applications are combinations of these three ingredients). Each ingredient may involve the use of one or more accelerator (e.g., FPGA, ASIC) components as a local backend. In this manner, applications can be split across multiple edge owners, coordinated by an orchestrator.

Figure 11:
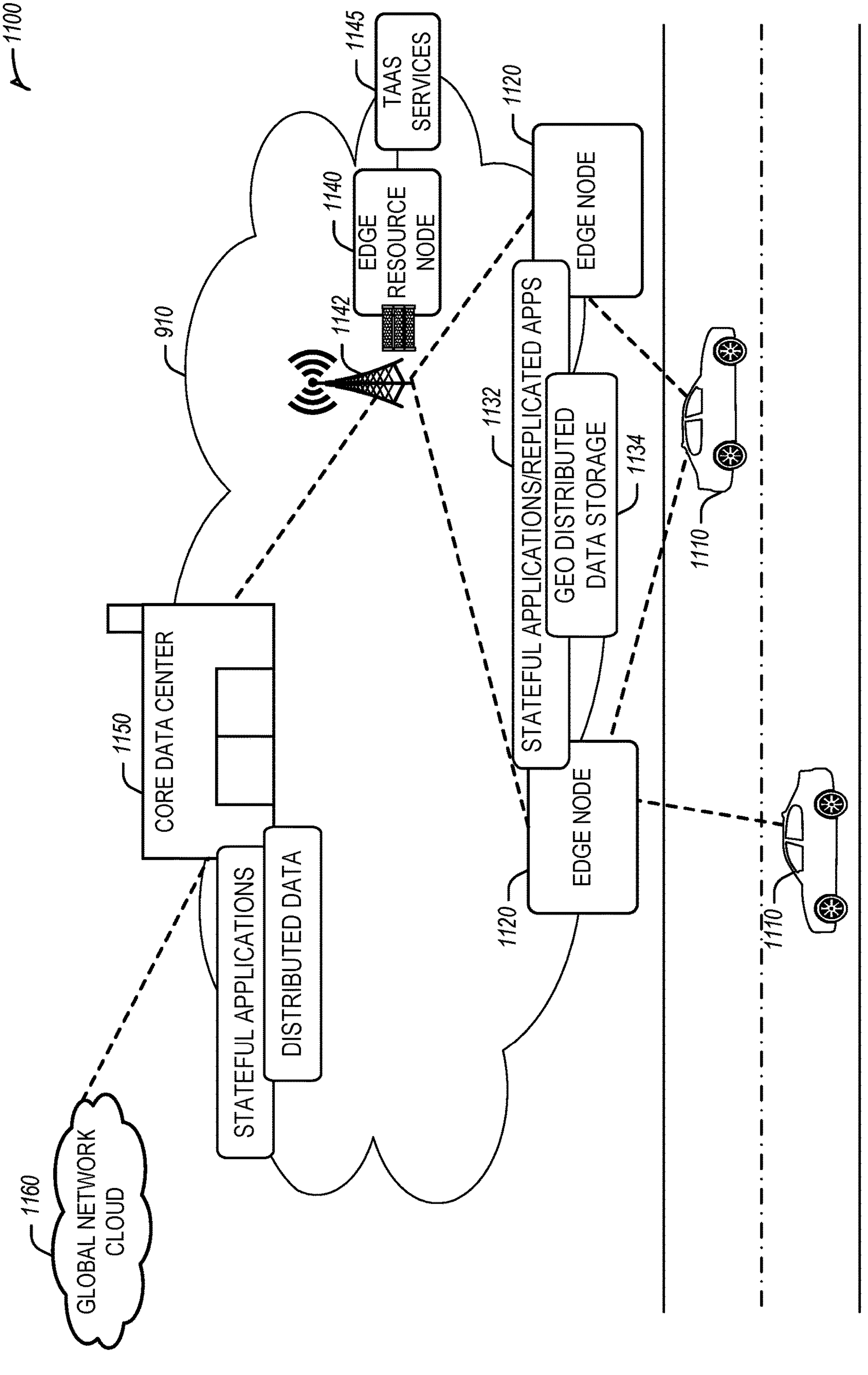
FIG. 11 illustrates a vehicle compute and communication use case involving mobile access to applications in an edge-computing system, according to an example.

It should be appreciated that the edge computing systems and arrangements discussed herein may be applicable in various solutions, services, and/or use cases. As an example, FIG. 11 shows a simplified vehicle compute and communication use case involving mobile access to applications in an edge computing system 1100 that implements an edge cloud 910 connected to Trust-as-a-service instances 1145. In this use case, each client compute node 1110 may be embodied as in-vehicle compute systems (e.g., in-vehicle navigation and/or infotainment systems) located in corresponding vehicles that communicate with the edge gateway nodes 1120 during traversal of a roadway. For instance, edge gateway nodes 1120 may be located in roadside cabinets, which may be placed along the roadway, at intersections of the roadway, or other locations near the roadway. As each vehicle traverses along the roadway, the connection between its client compute node 1110 and a particular edge gateway node 1120 may propagate to maintain a consistent connection and context for the client compute node 1110. Each of the edge gateway nodes 1120 includes some processing and storage capabilities and, as such, some processing and/or storage of data for the client compute nodes 1110 may be performed on one or more of the edge gateway nodes 1120.

Each of the edge gateway nodes 1120 may communicate with one or more edge resource nodes 1140, which are illustratively embodied as compute servers, appliances or components located at or in a communication base station 1142 (e.g., a base station of a cellular network). As discussed above, each edge resource node 1140 includes some processing and storage capabilities, and, as such, some processing and/or storage of data for the client compute nodes 1110 may be performed on the edge resource node 1140. For example, the processing of data that is less urgent or important may be performed by the edge resource node 1140, while the processing of data that is of a higher urgency or importance may be performed by edge gateway devices or the client nodes themselves (depending on, for example, the capabilities of each component). Further, various wired or wireless communication links (e.g., fiber optic wired backhaul, 5G wireless links) may exist among the edge nodes 1120, edge resource node(s) 340, core data center 1150, and network cloud 1160.

The edge resource node(s) 1140 also communicate with the core data center 1150, which may include compute servers, appliances, and/or other components located in a central location (e.g., a central office of a cellular communication network). The core data center 1150 may provide a gateway to the global network cloud 1160 (e.g., the Internet) for the edge cloud 910 operations formed by the edge resource node(s) 1140 and the edge gateway nodes 1120. Additionally, in some examples, the core data center 1150 may include an amount of processing and storage capabilities and, as such, some processing and/or storage of data for the client compute devices may be performed on the core data center 1150 (e.g., processing of low urgency or importance, or high complexity). The edge gateway nodes 1120 or the edge resource nodes 1140 may offer the use of stateful applications 1132 and a geographically distributed data storage 1134 (e.g., database, data store, etc.).

In further examples, FIG. 11 may utilize various types of mobile edge nodes, such as an edge node hosted in a vehicle (e.g., car, truck, tram, train, etc.) or other mobile units, as the edge node will move to other geographic locations along the platform hosting it. With vehicle-to-vehicle communications, individual vehicles may even act as network edge nodes for other cars, (e.g., to perform caching, reporting, data aggregation, etc.). Thus, it will be understood that the application components provided in various edge nodes may be distributed in a variety of settings, including coordination between some functions or operations at individual endpoint devices or the edge gateway nodes 1120, some others at the edge resource node 1140, and others in the core data center 1150 or the global network cloud 1160.

In further configurations, the edge computing system may implement FaaS computing capabilities through the use of respective executable applications and functions. In an example, a developer writes function code (e.g., "computer code" herein) representing one or more computer functions, and the function code is uploaded to a FaaS platform provided by, for example, an edge node or data center. A trigger such as, for example, a service use case or an edge processing event, initiates the execution of the function code with the FaaS platform.

In an example of FaaS, a container is used to provide an environment in which function code is executed. The container may be any isolated-execution entity such as a process, a Docker or Kubernetes container, a virtual machine, etc. Within the edge computing system, various datacenter, edge, and endpoint (including mobile) devices are used to "spin up" functions (e.g., activate and/or allocate function actions) that are scaled on demand. The function code gets executed on the physical infrastructure (e.g., edge computing node) device and underlying virtualized containers. Finally, the container is "spun down" (e.g., deactivated and/or deallocated) on the infrastructure in response to the execution being completed.

Further aspects of FaaS may enable deployment of edge functions in a service fashion, including support of respective functions that support edge computing as a service. Additional features of FaaS may include: a granular billing component that enables customers (e.g., computer code developers) to pay only when their code gets executed; common data storage to store data for reuse by one or more functions; orchestration and management among individual functions; function execution management, parallelism, and consolidation; management of container and function memory spaces; coordination of acceleration resources available for functions; and distribution of functions between containers (including "warm" containers, already deployed or operating, versus "cold" which require deployment or configuration).

Example Internet of Things Architectures

Figure 12:
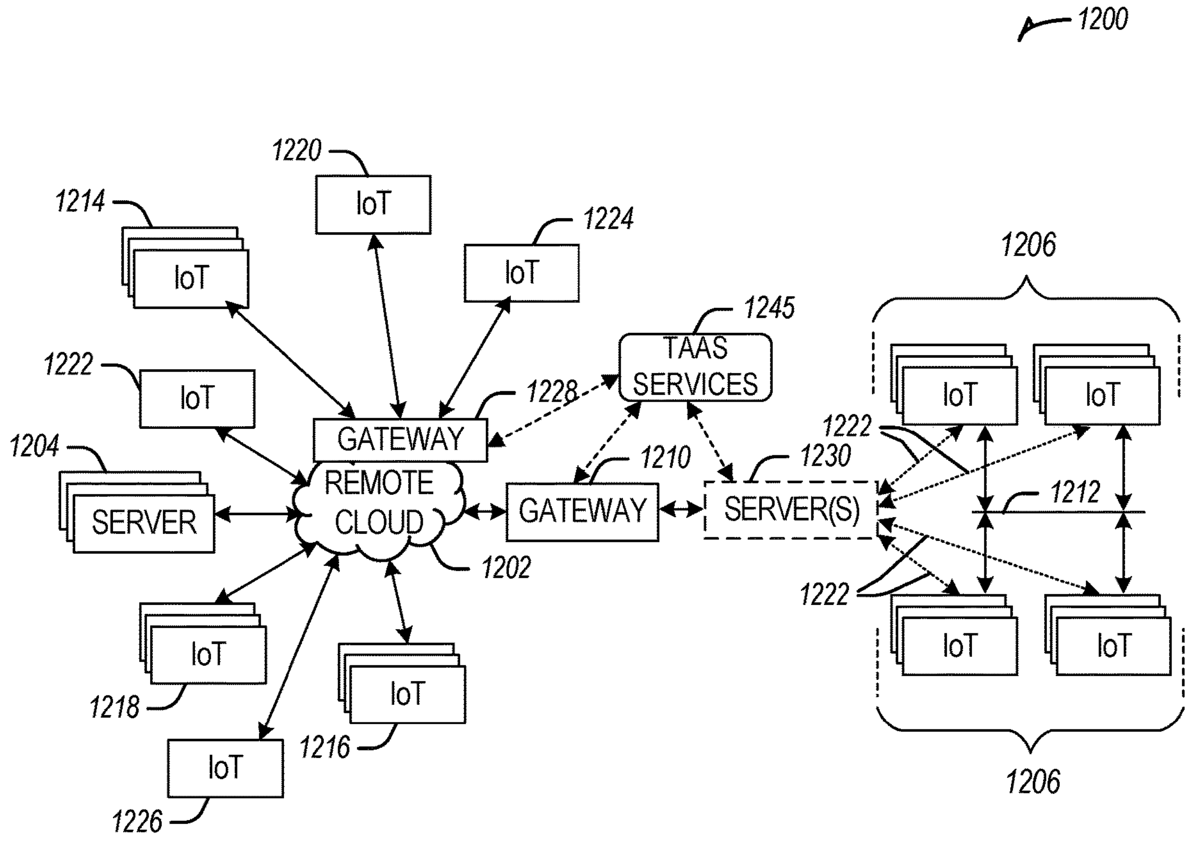
FIG. 12 illustrates a block diagram depicting deployment and communications among several Internet of Things (IoT) devices, according to an example.

As a more detailed illustration of an Internet of Things (IoT) network, FIG. 12 illustrates a drawing of a cloud or edge computing network 1200, in communication with several IoT devices and a TaaS instance 1245. The IoT is a concept in which a large number of computing devices are interconnected to each other and to the Internet to provide functionality and data acquisition at very low levels. Thus, as used herein, an IoT device may include a semiautonomous device performing a function, such as sensing or control, among others, in communication with other IoT devices and a wider network, such as the Internet.

Often, IoT devices are limited in memory, size, or functionality, allowing larger numbers to be deployed for a similar (or lower) cost compared to the cost of smaller numbers of larger devices. However, an IoT device may be a smartphone, laptop, tablet, or PC, or other larger device. Further, an IoT device may be a virtual device, such as an application on a smartphone or other computing device. IoT devices may include IoT gateways, used to couple IoT devices to other IoT devices and to cloud applications, for data storage, process control, and the like.

Networks of IoT devices may include commercial and home automation devices, such as water distribution systems, electric power distribution systems, pipeline control systems, plant control systems, light switches, thermostats, locks, cameras, alarms, motion sensors, and the like. The IoT devices may be accessible through remote computers, servers, and other systems, for example, to control systems or access data.

Returning to FIG. 12, the network 1200 may represent portions of the Internet or may include portions of a local area network (LAN), or a wide area network (WAN), such as a proprietary network for a company. The IoT devices may include any number of different types of devices, grouped in various combinations. For example, a traffic control group 1206 may include IoT devices along streets in a city. These IoT devices may include stoplights, traffic flow monitors, cameras, weather sensors, and the like. The traffic control group 406, or other subgroups, may be in communication within the network 1200 through wired or wireless links 1208, such as LPWA links, optical links, and the like. Further, a wired or wireless sub-network 1212 may allow the IoT devices to communicate with each other, such as through a local area network, a wireless local area network, and the like. The IoT devices may use another device, such as a gateway 1210 or 1228 to communicate with remote locations such as remote cloud 1202; the IoT devices may also use one or more servers 1230 to facilitate communication within the network 1200 or with the gateway 1210. For example, the one or more servers 1230 may operate as an intermediate network node to support a local edge cloud or fog implementation among a local area network. Further, the gateway 1228 that is depicted may operate in a cloud-to-gateway-to-many edge devices configuration, such as with the various IoT devices 1214, 1220, 1224 being constrained or dynamic to an assignment and use of resources in the network 1200.

In an example embodiment, the network 1200 can further include or be communicatively coupled to a Trust-a-a-Service instance or deployment configured to perform trust attestation operations within the network 1200, such as that discussed above.

Other example groups of IoT devices may include remote weather stations 1214, local information terminals 1216, alarm systems 1218, automated teller machines 1220, alarm panels 1222, or moving vehicles, such as emergency vehicles 1224 or other vehicles 1226, among many others. Each of these IoT devices may be in communication with other IoT devices, with servers 1204, with another IoT device or system, another edge computing or "fog" computing system, or a combination therein. The groups of IoT devices may be deployed in various residential, commercial, and industrial settings (including in either private or public environments).

As may be seen from FIG. 12, a large number of IoT devices may be communicating through the network 1200. This may allow different IoT devices to request or provide information to other devices autonomously. For example, a group of IoT devices (e.g., the traffic control group 1206) may request a current weather forecast from a group of remote weather stations 1214, which may provide the forecast without human intervention. Further, an emergency vehicle 1224 may be alerted by an automated teller machine 1220 that a burglary is in progress. As the emergency vehicle 1224 proceeds towards the automated teller machine 1220, it may access the traffic control group 1206 to request clearance to the location, for example, by lights turning red to block cross traffic at an intersection in sufficient time for the emergency vehicle 1224 to have unimpeded access to the intersection.

Clusters of IoT devices may be equipped to communicate with other IoT devices as well as with a cloud network. This may allow the IoT devices to form an ad-hoc network between the devices, allowing them to function as a single device, which may be termed a fog device or system. Clusters of IoT devices, such as may be provided by the remote weather stations 1214 or the traffic control group 1206, may be equipped to communicate with other IoT devices as well as with the network 1200. This may allow the IoT devices to form an ad-hoc network between the devices, allowing them to function as a single device, which also may be termed a fog device or system.

In further examples, a variety of topologies may be used for IoT networks comprising IoT devices, with the IoT networks coupled through backbone links to respective gateways. For example, a number of IoT devices may communicate with a gateway, and with each other through the gateway. The backbone links may include any number of wired or wireless technologies, including optical networks, and may be part of a local area network (LAN), a wide area network (WAN), or the Internet. Additionally, such communication links facilitate optical signal paths among both IoT devices and gateways, including the use of MUXing/deMUXing components that facilitate the interconnection of the various devices.

The network topology may include any number of types of IoT networks, such as a mesh network provided with the network using Bluetooth low energy (BLE) links. Other types of IoT networks that may be present include a wireless local area network (WLAN) network used to communicate with IoT devices through IEEE 802.11 (Wi-Fi®) links, a cellular network used to communicate with IoT devices through an LTE/LTE-A (4G) or 5G cellular network, and a low-power wide-area (LPWA) network, for example, a LPWA network compatible with the LoRaWan specification promulgated by the LoRa alliance, or an IPv6 over Low Power Wide-Area Networks (LPWAN) network compatible with a specification promulgated by the Internet Engineering Task Force (IETF).

Further, the respective IoT networks may communicate with an outside network provider (e.g., a tier 2 or tier 3 provider) using any number of communications links, such as an LTE cellular link, a LPWA link, or a link based on the IEEE 802.15.4 standard, such as Zigbee®. The respective IoT networks may also operate with the use of a variety of network and internet application protocols such as the Constrained Application Protocol (CoAP). The respective IoT networks may also be integrated with coordinator devices that provide a chain of links that forms a cluster tree of linked devices and networks.

IoT networks may be further enhanced by the integration of sensing technologies, such as sound, light, electronic traffic, facial and pattern recognition, smell, vibration, into the autonomous organizations among the IoT devices. The integration of sensory systems may allow systematic and autonomous communication and coordination of service delivery against contractual service objectives, orchestration, and quality of service (QoS) based swarming and coordination/combinations of resources.

An IoT network, arranged as a mesh network, for instance, may be enhanced by systems that perform inline data-to-information transforms. For example, self-forming chains of processing resources comprising a multi-link network may distribute the transformation of raw data to information in an efficient manner, and the ability to differentiate between assets and resources and the associated management of each. Furthermore, the proper components of infrastructure and resource-based trust and service indices may be inserted to improve the data integrity, quality, assurance, and deliver a metric of data confidence.

Example Computing Devices

Figure 13:
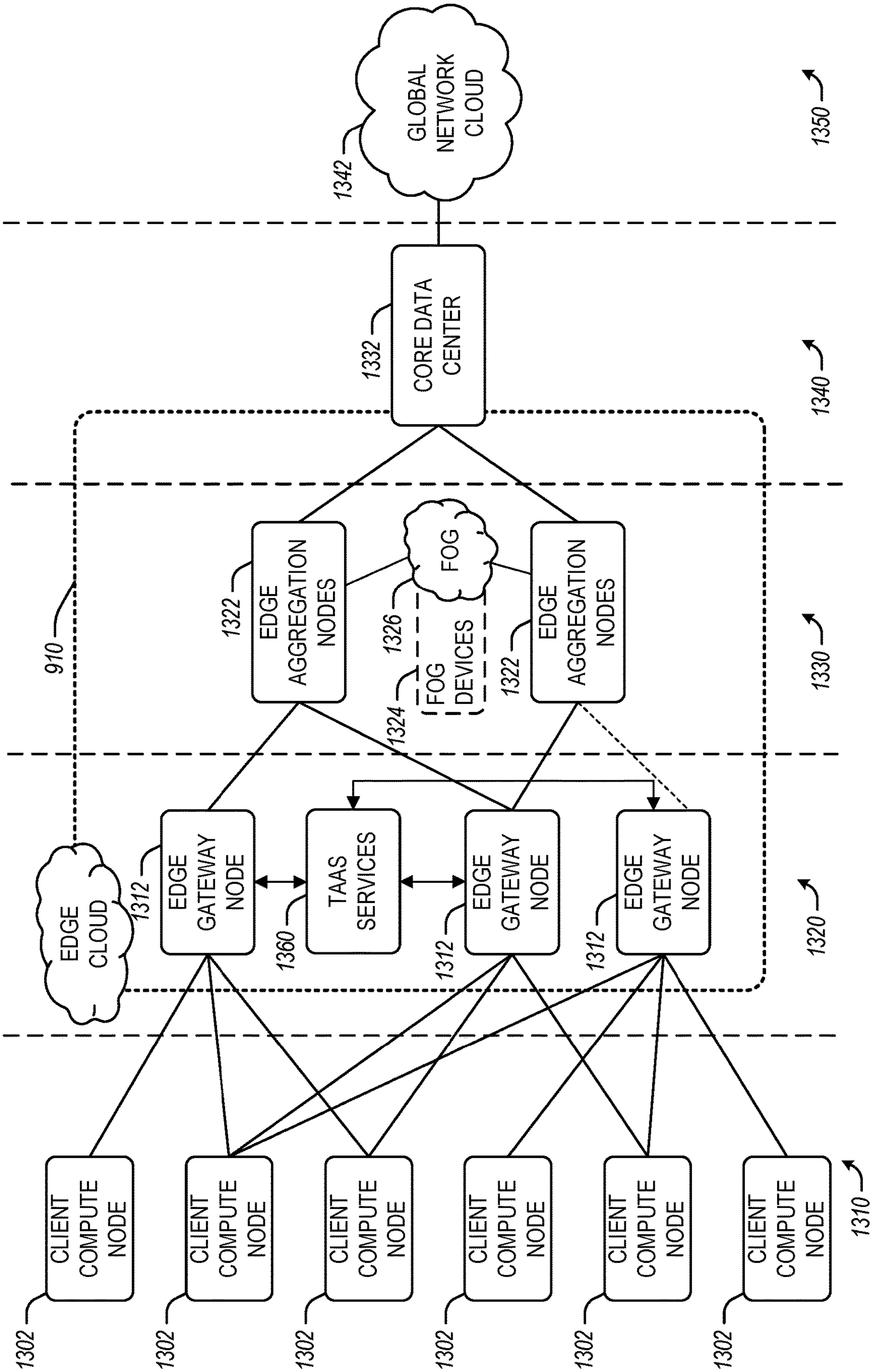
FIG. 13 illustrates an overview of layers of distributed compute deployed among an edge computing system, according to an example.

At a more generic level, an edge computing system may be described to encompass any number of deployments operating in the edge cloud 910, which provide coordination from client and distributed computing devices. FIG. 13 provides a further abstracted overview of layers of distributed compute deployed among an edge computing environment for purposes of illustration.

FIG. 13 generically depicts an edge computing system for providing edge services and applications to multi-stakeholder entities, as distributed among one or more client compute nodes 1302, one or more edge gateway nodes 1312, one or more edge aggregation nodes 1322, one or more core data centers 1332, and a global network cloud 1342, as distributed across layers of the network. The implementation of the edge computing system may be provided at or on behalf of a telecommunication service provider ("telco", or "TSP"), internet-of-things service provider, a cloud service provider (CSP), enterprise entity, or any other number of entities. Various forms of wired or wireless connections may be configured to establish connectivity among the nodes 1302, 1312, 1322, 1332, including interconnections among such nodes (e.g., connections among edge gateway nodes 1312, and connections among edge aggregation nodes 1322). Such connectivity and federation of these nodes may be assisted with the use of TaaS services 2560 and service instances, as discussed herein.

Each node or device of the edge computing system is located at a particular layer corresponding to layers 1310, 1320, 1330, 1340, and 1350. For example, the client compute nodes 1302 are each located at an endpoint layer 1310, while each of the edge gateway nodes 1312 is located at an edge devices layer 1320 (local level) of the edge computing system. Additionally, each of the edge aggregation nodes 1322 (and/or fog devices 1324, if arranged or operated with or among a fog networking configuration 1326) is located at a network access layer 1330 (an intermediate level). Fog computing (or "fogging") generally refers to extensions of cloud computing to the edge of an enterprise's network, typically in a coordinated distributed or multi-node network. Some forms of fog computing provide the deployment of compute, storage, and networking services between end devices and cloud computing data centers, on behalf of the cloud computing locations. Such forms of fog computing provide operations that are consistent with edge computing as discussed herein; many of the edge computing aspects discussed herein apply to fog networks, fogging, and fog configurations. Further, aspects of the edge computing systems discussed herein may be configured as a fog, or aspects of a fog may be integrated into an edge computing architecture.

The core data center 1332 is located at a core network layer 1340 (e.g., a regional or geographically-central level), while the global network cloud 1342 is located at a cloud data center layer 1350 (e.g., a national or global layer). The use of "core" is provided as a term for a centralized network location—deeper in the network—which is accessible by multiple edge nodes or components; however, a "core" does not necessarily designate the "center" or the deepest location of the network. Accordingly, the core data center 1332 may be located within, at, or near the edge cloud 910.

Although an illustrative number of client compute nodes 1302, edge gateway nodes 1312, edge aggregation nodes 1322, core data centers 1332, and global network clouds 1342 are shown in FIG. 13, it should be appreciated that the edge computing system may include more or fewer devices or systems at each layer. Additionally, as shown in FIG. 13, the number of components of each layer 1310, 1320, 1330, 1340, and 1350 generally increases at each lower level (i.e., when moving closer to endpoints). As such, one edge gateway node 1312 may service multiple client compute nodes 1302, and one edge aggregation node 1322 may service multiple edge gateway nodes 1312.

Consistent with the examples provided herein, each client compute node 1302 may be embodied as any type of end point component, device, appliance, or "thing" capable of communicating as a producer or consumer of data. Further, the label "node" or "device" as used in the edge computing system 1300 does not necessarily mean that such node or device operates in a client or minion/follower/agent role; rather, any of the nodes or devices in the edge computing system 1300 refer to individual entities, nodes, or subsystems which include discrete or connected hardware or software configurations to facilitate or use the edge cloud 910.

As such, the edge cloud 910 is formed from network components and functional features operated by and within the edge gateway nodes 1312 and the edge aggregation nodes 1322 of layers 1320, 1330, respectively. The edge cloud 910 may be embodied as any type of network that provides edge computing and/or storage resources which are proximately located to radio access network (RAN) capable endpoint devices (e.g., mobile computing devices, IoT devices, smart devices, etc.), which are shown in FIG. 13 as the client compute nodes 1302. In other words, the edge cloud 910 may be envisioned as an "edge" which connects the endpoint devices and traditional mobile network access points that serves as an ingress point into service provider core networks, including carrier networks (e.g., Global System for Mobile Communications (GSM) networks, Long-Term Evolution (LTE) networks, 5G networks, etc.), while also providing storage and/or compute capabilities. Other types and forms of network access (e.g., Wi-Fi, long-range wireless networks) may also be utilized in place of or in combination with such 3GPP carrier networks.

In some examples, the edge cloud 910 may form a portion of or otherwise provide an ingress point into or across a fog networking configuration 1326 (e.g., a network of fog devices 1324, not shown in detail), which may be embodied as a system-level horizontal and distributed architecture that distributes resources and services to perform a specific function. For instance, a coordinated and distributed network of fog devices 1324 may perform computing, storage, control, or networking aspects in the context of an IoT system arrangement. Other networked, aggregated, and distributed functions may exist in the edge cloud 910 between the cloud data center layer 1350 and the client endpoints (e.g., client compute nodes 1302). Some of these are discussed in the following sections in the context of network functions or service virtualization, including the use of virtual edges and virtual services which are orchestrated for multiple stakeholders.

The edge gateway nodes 1312 and the edge aggregation nodes 1322 cooperate to provide various edge services and compute security features to the client compute nodes 1302. Furthermore, because each client compute node 1302 may be stationary or mobile, each edge gateway node 1312 may cooperate with other edge gateway devices to propagate presently provided edge services and compute security features as the corresponding client compute node 1302 moves about a region. To do so, each of the edge gateway nodes 1312 and/or edge aggregation nodes 1322 may support multiple tenancies and multiple stakeholder configurations, in which services from (or hosted for) multiple service providers and multiple consumers may be supported and coordinated across a single or multiple compute devices.

In further examples, any of the compute nodes or devices discussed with reference to the present edge computing systems and environment may be fulfilled based on the components depicted in FIGS. 14 and 15. Each edge compute node may be embodied as a type of device, appliance, computer, or other "thing" capable of communicating with other edge, networking, or endpoint components. For example, an edge compute device may be embodied as a personal computer, a server, smartphone, a mobile compute device, a smart appliance, an in-vehicle compute system (e.g., a navigation system), a self-contained device having an outer case, shell, etc., or other devices or systems capable of performing the described functions.

Figure 14:
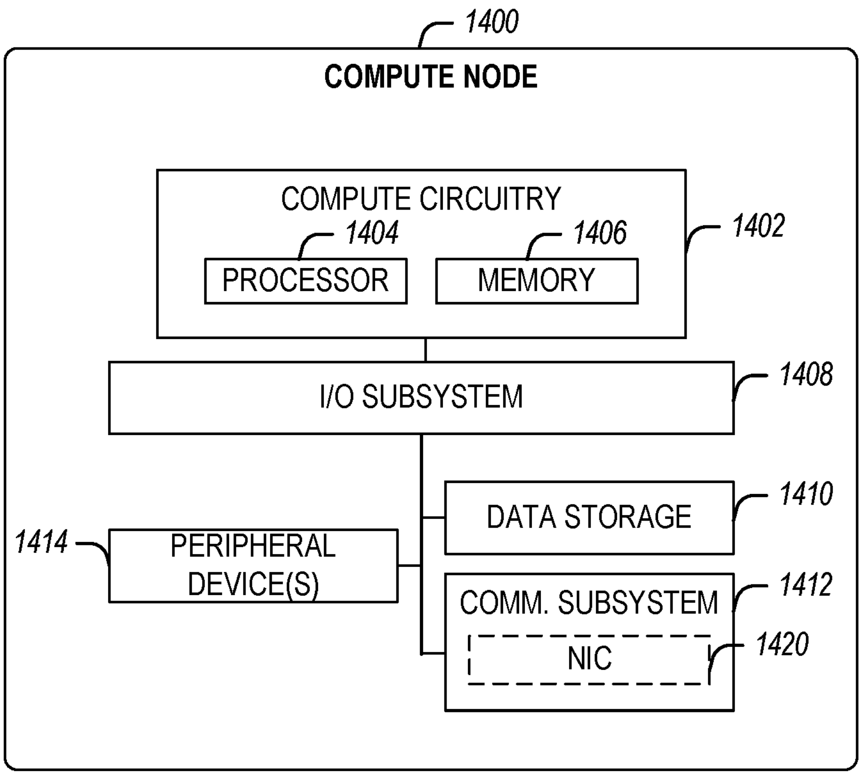
FIG. 14 illustrates an overview of example components deployed at a compute node system, according to an example.

In the simplified example depicted in FIG. 14, an edge compute node 1400 includes a compute engine (also referred to herein as "compute circuitry") 1402, an input/output (I/O) subsystem 1408, data storage 1410, a communication circuitry subsystem 1412, and, optionally, one or more peripheral devices 1414. In other examples, each compute device may include other or additional components, such as those used in personal or server computing systems (e.g., a display, peripheral devices, etc.). Additionally, in some examples, one or more of the illustrative components may be incorporated in, or otherwise form a portion of, another component.

The compute node 1400 may be embodied as any type of engine, device, or collection of devices capable of performing various compute functions. In some examples, the compute node 1400 may be embodied as a single device such as an integrated circuit, an embedded system, a field-programmable gate array (FPGA), a system-on-a-chip (SOC), or other integrated system or device. In the illustrative example, the compute node 1400 includes or is embodied as a processor 1404 and a memory 1406. The processor 1404 may be embodied as any type of processor capable of performing the functions described herein (e.g., executing an application). For example, the processor 1404 may be embodied as a multi-core processor(s), a microcontroller, a processing unit, a specialized or special purpose processing unit, or other processor or processing/controlling circuit. In some examples, the processor 1404 may be embodied as, include, or be coupled to an FPGA, an application-specific integrated circuit (ASIC), reconfigurable hardware or hardware circuitry, or other specialized hardware to facilitate performance of the functions described herein. Also in some examples, the processor 1404 may be embodied as a specialized x-processing unit (xPU) also known as a data processing unit (DPU), infrastructure processing unit (IPU), or network processing unit (NPU). Such an xPU may be embodied as a standalone circuit or circuit package, integrated within an SOC, or integrated with networking circuitry (e.g., in a SmartNIC, or enhanced SmartNIC), dedicated compute circuitry, storage devices, or AI or specialized hardware (e.g., GPUs, programmed FPGAs, Network Processing Units (NPUs), Infrastructure Processing Units (IPUs), Storage Processing Units (SPUs), AI Processors (APUs), Data Processing Unit (DPUs), or other specialized compute units such as a cryptographic processing unit/accelerator). Such an xPU may be designed to receive programming to process one or more data streams and perform specific tasks and actions for the data streams (such as hosting microservices, performing service management or orchestration, organizing or managing server or data center hardware, managing service meshes, or collecting and distributing telemetry), outside of the CPU or general purpose processing hardware. However, it will be understood that an xPU, a SOC, a CPU, and other variations of the processor 1404 may work in coordination with each other to execute many types of operations and instructions within and on behalf of the compute node 1400.

The main memory 1406 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. Non-limiting examples of volatile memory may include various types of random access memory (RAM), such as DRAM or static random access memory (SRAM). One particular type of DRAM that may be used in a memory module is synchronous dynamic random access memory (SDRAM).

In one example, the memory device is a block addressable memory device, such as those based on NAND or NOR technologies. A memory device may also include a three-dimensional crosspoint memory device (e.g., Intel 3D XPoint™ memory), or other byte-addressable write-in-place nonvolatile memory devices. The memory device may refer to the die itself and/or to a packaged memory product. In some examples, 3D crosspoint memory (e.g., Intel 3D XPoint™ memory) may comprise a transistor-less stackable cross-point architecture in which memory cells sit at the intersection of word lines and bit lines and are individually addressable and in which bit storage is based on a change in bulk resistance. In some examples, all or a portion of the main memory 1406 may be integrated into the processor 1404. The main memory 1406 may store various software and data used during operation such as one or more applications, data operated on by the application(s), libraries, and drivers.

The compute circuitry 1402 is communicatively coupled to other components of the compute node 1400 via the I/O subsystem 1408, which may be embodied as circuitry and/or components to facilitate input/output operations with the compute circuitry 1402 (e.g., with the processor 1404 and/or the main memory 1406) and other components of the compute circuitry 1402. For example, the I/O subsystem 1408 may be embodied as, or otherwise include memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some examples, the I/O subsystem 1408 may form a portion of a system-on-a-chip (SoC) and be incorporated, along with one or more of the processor 1404, the main memory 1406, and other components of the compute circuitry 1402, into the compute circuitry 1402.

The one or more illustrative data storage devices 1410 may be embodied as any type of device configured for short-term or long-term storage of data such as, for example, memory devices and circuits, memory cards, hard disk drives, solid-state drives, or other data storage devices. Each data storage device 1410 may include a system partition that stores data and firmware code for the data storage device 1410. Each data storage device 1410 may also include one or more operating system partitions that store data files and executables for operating systems depending on, for example, the type of compute node 1400.

The communication circuitry 1412 may be embodied as any communication circuit, device, or collection thereof, capable of enabling communications over a network between the compute circuitry 1402 and another compute device (e.g., an edge gateway node 1312 of the edge computing system 1300). The communication circuitry 1412 may be configured to use any one or more communication technology (e.g., wired or wireless communications) and associated protocols (e.g., a cellular networking protocol such a 3GPP 4G or 5G standard, a wireless local area network protocol such as IEEE 802.11/Wi-Fi®, a wireless wide area network protocol, Ethernet, Bluetooth®, Bluetooth Low Energy, an IoT protocol such as IEEE 802.15.4 or ZigBee®, low-power wide-area network (LPWAN) or low-power wide-area (LPWA) protocols, etc.) to effect such communication.

The illustrative communication circuitry 1412 includes a network interface controller (NIC) 1420, which may also be referred to as a host fabric interface (HFI). The NIC 1420 may be embodied as one or more add-in-boards, daughter cards, network interface cards, controller chips, chipsets, or other devices that may be used by the compute node 1400 to connect with another compute device (e.g., an edge gateway node 1312). In some examples, the NIC 1420 may be embodied as part of a system-on-a-chip (SoC) that includes one or more processors or included on a multichip package that also contains one or more processors. In some examples, the NIC 1420 may include a local processor (not shown) and/or a local memory and storage (not shown) that are local to the NIC 1420. In such examples, the local processor of the MC 1420 (which can include general-purpose accelerators or specific accelerators) may be capable of performing one or more of the functions of the compute circuitry 1402 described herein. Additionally, or alternatively, the local memory of the NIC 1420 may be integrated into one or more components of the client compute node at the board level, socket level, chip level, and/or other levels.

Additionally, in some examples, each compute node 1400 may include one or more peripheral devices 1414. Such peripheral devices 1414 may include any type of peripheral device found in a compute device or server such as audio input devices, a display, other input/output devices, interface devices, and/or other peripheral devices, depending on the particular type of the compute node 1400. In further examples, the compute node 1400 may be embodied by a respective edge compute node in an edge computing system (e.g., client compute node 1302, edge gateway node 1312, edge aggregation node 1322) or like forms of appliances, computers, subsystems, circuitry, or other components.

Figure 15:
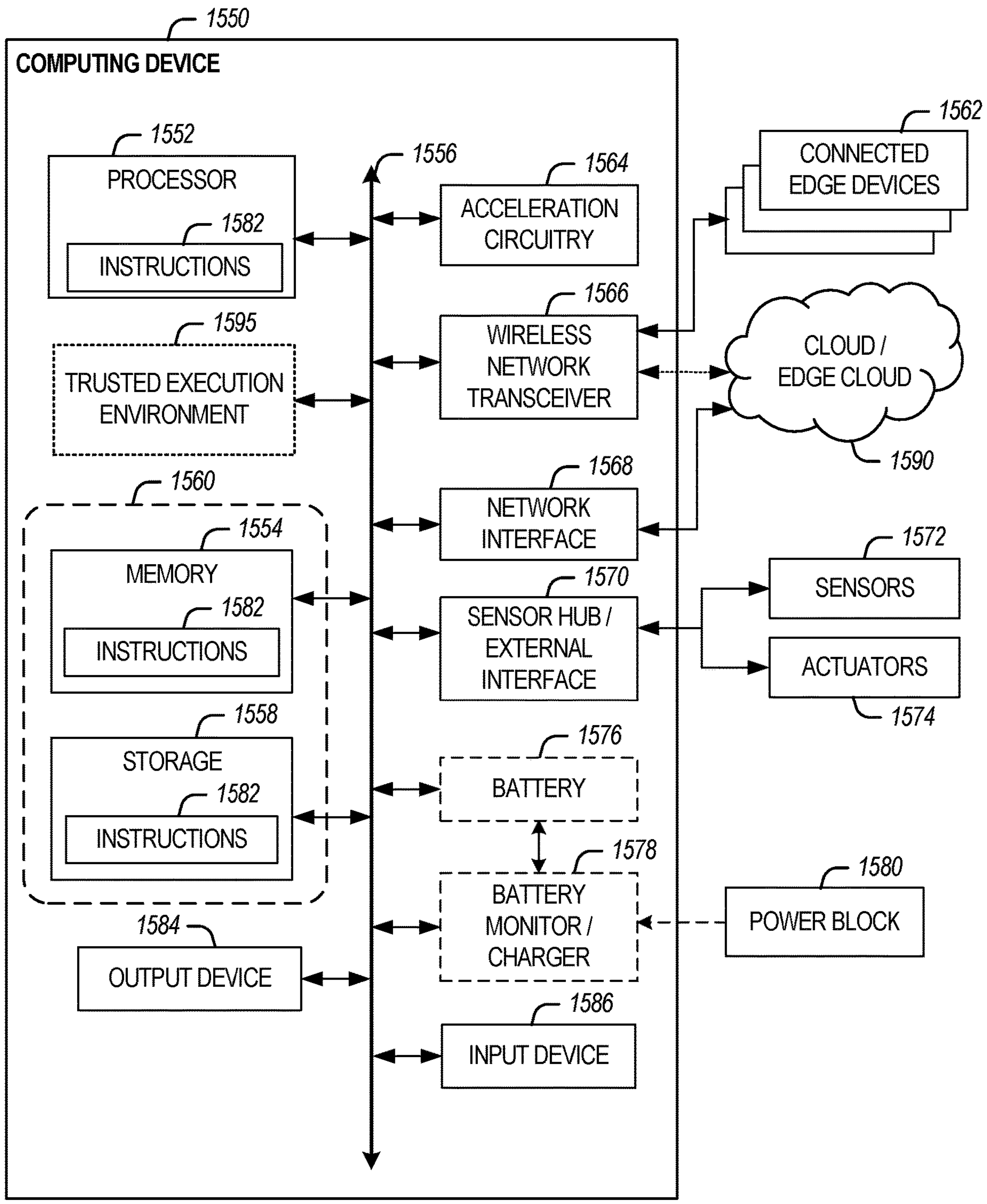
FIG. 15 illustrates a further overview of example components within a computing device, according to an example.

In a more detailed example, FIG. 15 illustrates a block diagram of an example of components that may be present in an edge computing device (or node) 1550 for implementing the techniques (e.g., operations, processes, methods, and methodologies) described herein. The edge computing node 1550 provides a closer view of the respective components of node 1400 when implemented as or as part of a computing device (e.g., as a mobile device, a base station, server, gateway, etc.). The edge computing node 1550 may include any combinations of the components referenced above, and it may include any device usable with an edge communication network or a combination of such networks. The components may be implemented as integrated circuits (ICs), portions thereof, discrete electronic devices, or other modules, logic, instruction sets, programmable logic or algorithms, hardware, hardware accelerators, software, firmware, or a combination thereof adapted in the edge computing node 1550, or as components otherwise incorporated within a chassis of a larger system.

The edge computing node 1550 may include processing circuitry in the form of a processor 1552, which may be a microprocessor, a multi-core processor, a multithreaded processor, an ultra-low voltage processor, an embedded processor, an xPU/DPU/IPU/NPU, special purpose processing unit, specialized processing unit, or other known processing elements. The processor 1552 may be a part of a system on a chip (SoC) in which the processor 1552 and other components are formed into a single integrated circuit, or a single package, such as the Edison™ or Galileo™ SoC boards from Intel Corporation, Santa Clara, California. As an example, the processor 1552 may include an Intel® Architecture Core™ based processor, such as a Quark™, an Atom™, an i3, an i5, an i7, an i9, or an MCU-class processor, or another such processor available from Intel®. However, any number other processors may be used, such as available from Advanced Micro Devices, Inc. (AMD) of Sunnyvale, California, a MIPS-based design from MIPS Technologies, Inc. of Sunnyvale, California, an ARM-based design licensed from ARM Holdings, Ltd. or a customer thereof, or their licensees or adopters. The processors may include units such as an A5-A14 processor from Apple® Inc., a Snapdragon™ processor from Qualcomm® Technologies, Inc., or an OMAP™ processor from Texas Instruments, Inc. The processor 1552 and accompanying circuitry may be provided in a single socket form factor, multiple socket form factor, or a variety of other formats, including in limited hardware configurations or configurations that include fewer than all elements shown in FIG. 15.

The processor 1552 may communicate with a system memory 1554 over an interconnect 1556 (e.g., a bus). Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR, LPDDR2, LPDDR3, or LPDDR4). In particular examples, a memory component may comply with a DRAM standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces. In various implementations, the individual memory devices may be of any number of different package types such as single die package (SDP), dual die package (DDP), or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems, and so forth, a storage 1558 may also couple to the processor 1552 via the interconnect 1556. In an example, the storage 1558 may be implemented via a solid-state disk drive (SSDD). Other devices that may be used for the storage 1558 include flash memory cards, such as SD cards, microSD cards, XD picture cards, and the like, and USB flash drives. In an example, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin-transfer torque (STT)-MRAM, a spintronic magnetic junction memory-based device, a magnetic tunneling junction (MTJ) based device, a DW (Domain Wall) and SOT (Spin-Orbit Transfer) based device, a thyristor-based memory device, or a combination of any of the above, or other memory.

In low power implementations, the storage 1558 may be on-die memory or registers associated with the processor 1552. However, in some examples, the storage 1558 may be implemented using a micro hard disk drive (HDD) or solid-state drive (SSD). Further, any number of new technologies may be used for the storage 1558 in addition to, or instead of, the technologies described, such resistance change memories, phase change memories, holographic memories, or chemical memories, among others.

The components may communicate over the interconnect 1556. The interconnect 1556 may include any number of technologies, including industry-standard architecture (ISA), extended ISA (EISA), peripheral component interconnect (PCI), peripheral component interconnect extended (PCIx), PCI express (PCIe), or any number of other technologies. The interconnect 1556 may be a proprietary bus, for example, used in an SoC based system. Other bus systems may be included, such as an I2C interface, an SPI interface, point to point interfaces, and a power bus, among others.

The interconnect 1556 may couple the processor 1552 to a transceiver 1566, for communications with the connected edge devices 1562. The transceiver 1566 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the connected edge devices 1562. For example, a wireless local area network (WLAN) unit may be used to implement Wi-Fi® communications in accordance with the Institute of Electrical and Electronics Engineers (IEEE) 802.11 standard. In addition, wireless wide area communications, e.g., according to a cellular or other wireless wide area protocol, may occur via a wireless wide area network (WWAN) unit.

The wireless network transceiver 1566 (or multiple transceivers) may communicate using multiple standards or radios for communications at a different range. For example, the edge computing node 1550 may communicate with close devices, e.g., within about 10 meters, using a local transceiver based on BLE, or another low power radio, to save power. More distant connected edge devices 1562, e.g., within about 50 meters, may be reached over ZigBee or other intermediate power radios. Both communications techniques may take place over a single radio at different power levels or may take place over separate transceivers, for example, a local transceiver using BLE and a separate mesh transceiver using ZigBee®.

A wireless network transceiver 1566 (e.g., a radio transceiver) may be included to communicate with devices or services in the edge cloud 1590 via local or wide area network protocols. The wireless network transceiver 1566 may be an LPWA transceiver that follows the IEEE 802.15.4, or IEEE 802.15.4g standards, among others. The edge computing node 1550 may communicate over a wide area using LoRaWAN™ (Long Range Wide Area Network) developed by Semtech and the LoRa Alliance. The techniques described herein are not limited to these technologies but may be used with any number of other cloud transceivers that implement long-range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the wireless network transceiver 1566, as described herein. For example, the transceiver 1566 may include a cellular transceiver that uses spread spectrum (SPA/SAS) communications for implementing high-speed communications. Further, any number of other protocols may be used, such as Wi-Fi® networks for medium speed communications and provision of network communications. The transceiver 1566 may include radios that are compatible with any number of 3GPP (Third Generation Partnership Project) specifications, such as Long Term Evolution (LTE) and 5th Generation (5G) communication systems, discussed in further detail at the end of the present disclosure. A network interface controller (NIC) 1568 may be included to provide a wired communication to nodes of the edge cloud 1590 or other devices, such as the connected edge devices 1562 (e.g., operating in a mesh). The wired communication may provide an Ethernet connection or may be based on other types of networks, such as Controller Area Network (CAN), Local Interconnect Network (LIN), DeviceNet, ControlNet, Data Highway+, PROFIBUS, or PROFINET, Time Sensitive Networks (TSN), among many others. An additional NIC 1568 may be included to enable connecting to a second network, for example, a first NIC 1568 providing communications to the cloud over Ethernet, and a second NIC 1568 providing communications to other devices over another type of network.

Given the variety of types of applicable communications from the device to another component or network, applicable communications circuitry used by the device may include or be embodied by any one or more of components 1564, 1566, 1568, or 1570. Accordingly, in various examples, applicable means for communicating (e.g., receiving, transmitting, etc.) may be embodied by such communications circuitry.

The edge computing node 1550 may include or be coupled to acceleration circuitry 1564, which may be embodied by one or more AI accelerators, a neural compute stick, neuromorphic hardware, an FPGA, an arrangement of GPUs, an arrangement of xPUs/DPUs/IPU/NPUs, one or more SoCs, one or more CPUs, one or more digital signal processors, dedicated ASICs, or other forms of specialized processors or circuitry designed to accomplish one or more specialized tasks. These tasks may include AI processing (including machine learning, training, inferencing, and classification operations), visual data processing, network data processing, object detection, rule analysis, or the like. Accordingly, in various examples, applicable means for acceleration may be embodied by such acceleration circuitry.

The interconnect 1556 may couple the processor 1552 to a sensor hub or external interface 1570 that is used to connect additional devices or subsystems. The devices may include sensors 1572, such as accelerometers, level sensors, flow sensors, optical light sensors, camera sensors, temperature sensors, a global navigation system (e.g., GPS) sensors, pressure sensors, barometric pressure sensors, and the like. The hub or interface 1570 further may be used to connect the edge computing node 1550 to actuators 1574, such as power switches, valve actuators, an audible sound generator, a visual warning device, and the like.

In some optional examples, various input/output (I/O) devices may be present within or connected to, the edge computing node 1550. For example, a display or other output device 1584 may be included to show information, such as sensor readings or actuator position. An input device

1586, such as a touch screen or keypad may be included to accept input. An output device 1584 may include any number of forms of audio or visual display, including simple visual outputs such as binary status indicators (e.g., LEDs) and multi-character visual outputs, or more complex outputs such as display screens (e.g., LCD screens), with the output of characters, graphics, multimedia objects, and the like being generated or produced from the operation of the edge computing node 1550. A display or console hardware, in the context of the present system, may be used to provide output and receive input of an edge computing system; to manage components or services of an edge computing system; identify a state of an edge computing component or service; or to conduct any other number of management or administration functions or service use cases.

A battery 1576 may power the edge computing node 1550, although, in examples in which the edge computing node 1550 is mounted in a fixed location, it may have a power supply coupled to an electrical grid, or the battery may be used as a backup or for temporary capabilities. The battery 1576 may be a lithium-ion battery, or a metal-air battery, such as a zinc-air battery, an aluminum-air battery, a lithium-air battery, and the like.

A battery monitor/charger 1578 may be included in the edge computing node 1550 to track the state of charge (SoCh) of the battery 1576. The battery monitor/charger 1578 may be used to monitor other parameters of the battery 1576 to provide failure predictions, such as the state of health (SoH) and the state of function (SoF) of the battery 1576. The battery monitor/charger 1578 may include a battery monitoring integrated circuit, such as an LTC4020 or an LTC2990 from Linear Technologies, an ADT7488A from ON Semiconductor of Phoenix Arizona, or an IC from the UCD90xxx family from Texas Instruments of Dallas, TX. The battery monitor/charger 1578 may communicate the information on the battery 1576 to the processor 1552 over the interconnect 1556. The battery monitor/charger 1578 may also include an analog-to-digital (ADC) converter that enables the processor 1552 to directly monitor the voltage of the battery 1576 or the current flow from the battery 1576. The battery parameters may be used to determine actions that the edge computing node 1550 may perform, such as transmission frequency, mesh network operation, sensing frequency, and the like.

A power block 1580, or other power supply coupled to a grid, may be coupled with the battery monitor/charger 1578 to charge the battery 1576. In some examples, the power block 1580 may be replaced with a wireless power receiver to obtain the power wirelessly, for example, through a loop antenna in the edge computing node 1550. A wireless battery charging circuit, such as an LTC4020 chip from Linear Technologies of Milpitas, California, among others, may be included in the battery monitor/charger 1578. The specific charging circuits may be selected based on the size of the battery 1576, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 1558 may include instructions 1582 in the form of software, firmware, or hardware commands to implement the techniques described herein. Although such instructions 1582 are shown as code blocks included in the memory 1554 and the storage 1558, it may be understood that any of the code blocks may be replaced with hardwired circuits, for example, built into an application-specific integrated circuit (ASIC).

Also in a specific example, the instructions 1582 on the processor 1552 (separately, or in combination with the instructions 1582 of the machine readable medium 1560) may configure execution or operation of a trusted execution environment (TEE) 1595. In an example, the TEE 1595 operates as a protected area accessible to the processor 1552 for secure execution of instructions and secure access to data. Various implementations of the TEE 1595, and an accompanying secure area in the processor 1552 or the memory 1554 may be provided, for instance, through use of Intel® Software Guard Extensions (SGX) or ARM® TrustZone® hardware security extensions, Intel® Management Engine (ME), or Intel® Converged Security Manageability Engine (CSME). Other aspects of security hardening, hardware roots-of-trust, and trusted or protected operations may be implemented in the edge computing node 1550 through the TEE 1595 and the processor 1552.

In an example, the instructions 1582 provided via memory 1554, the storage 1558, or the processor 1552 may be embodied as a non-transitory, machine-readable medium 1560 including code to direct the processor 1552 to perform electronic operations in the edge computing node 1550. The processor 1552 may access the non-transitory, machine-readable medium 1560 over the interconnect 1556. For instance, the non-transitory, machine-readable medium 1560 may be embodied by devices described for the storage 1558 or may include specific storage units such as optical disks, flash drives, or any number of other hardware devices. The non-transitory, machine-readable medium 1560 may include instructions to direct the processor 1552 to perform a specific sequence or flow of actions, for example, as described with respect to the flowchart(s) and block diagram(s) of operations and functionality depicted above. As used herein, the terms "machine-readable medium", "computer-readable medium", "machine-readable storage", and "computer-readable storage" are interchangeable.

In an example embodiment, the edge computing node 1550 can be implemented using components/modules/blocks 1552-1586 which are configured as IP Blocks. Each IP Block may contain a hardware RoT (e.g., device identifier composition engine, or DICE), where a DICE key may be used to identify and attest the IP Block firmware to a peer IP Block or remotely to one or more of components/modules/blocks 1562-1580. Thus, it will be understood that the node 1550 itself may be implemented as a SoC or standalone hardware package.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., HTTP).

A machine-readable medium may be provided by a storage device or other apparatus which is capable of hosting data in a non-transitory format. In an example, information stored or otherwise provided on a machine-readable medium may be representative of instructions, such as instructions themselves or a format from which the instructions may be derived. This format from which the instructions may be derived may include source code, encoded instructions (e.g., in compressed or encrypted form), packaged instructions (e.g., split into multiple packages), or the like. The information representative of the instructions in the machine-readable medium may be processed by processing circuitry into the instructions to implement any of the operations discussed herein. For example, deriving the instructions from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions.

In an example, the derivation of the instructions may include assembly, compilation, or interpretation of the information (e.g., by the processing circuitry) to create the instructions from some intermediate or preprocessed format provided by the machine-readable medium. The information, when provided in multiple parts, may be combined, unpacked, and modified to create the instructions. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable, etc.) at a local machine, and executed by the local machine.

Each of the block diagrams of FIGS. 14 and 15 is intended to depict a high-level view of components of a device, subsystem, or arrangement of an edge computing node. However, it will be understood that some of the components shown may be omitted, additional components may be present, and a different arrangement of the components shown may occur in other implementations.

Figure 16:
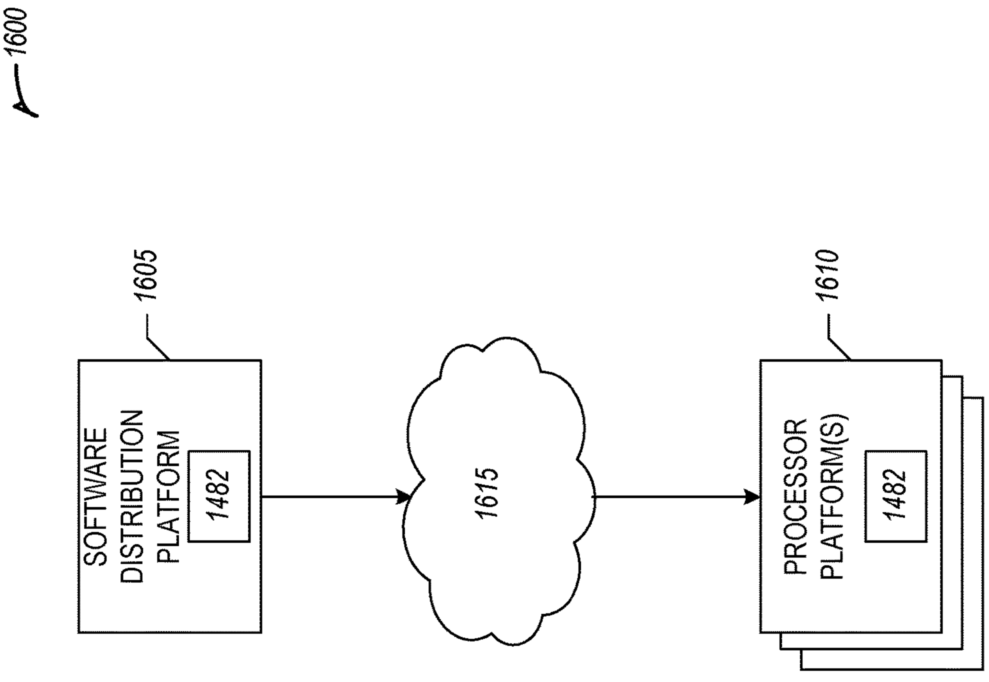
FIG. 16 illustrates a software distribution platform to distribute software instructions and derivatives, according to an example.

FIG. 16 illustrates an example software distribution platform 1605 to distribute software, such as the example computer readable instructions 1582 of FIG. 15, to one or more devices, such as example processor platform(s) 16 and/or other example connected edge devices or systems discussed herein. The example software distribution platform 1605 may be implemented by any computer server, data facility, cloud service, etc., capable of storing and transmitting software to other computing devices. Example connected edge devices may be customers, clients, managing devices (e.g., servers), third parties (e.g., customers of an entity owning and/or operating the software distribution platform 1605). Example connected edge devices may operate in commercial and/or home automation environments. In some examples, a third party is a developer, a seller, and/or a licensor of software such as the example computer readable instructions 1582 of FIG. 15. The third parties may be consumers, users, retailers, OEMs, etc. that purchase and/or license the software for use and/or re-sale and/or sub-licensing. In some examples, distributed software causes display of one or more user interfaces (UIs) and/or graphical user interfaces (GUIs) to identify the one or more devices (e.g., connected edge devices) geographically and/or logically separated from each other (e.g., physically separated IoT devices chartered with the responsibility of water distribution control (e.g., pumps), electricity distribution control (e.g., relays), etc.).

In the illustrated example of FIG. 16, the software distribution platform 1605 includes one or more servers and one or more storage devices that store the computer readable instructions 1582. The one or more servers of the example software distribution platform 1605 are in communication with a network 1615, which may correspond to any one or more of the Internet and/or any of the example networks described above. In some examples, the one or more servers are responsive to requests to transmit the software to a requesting party as part of a commercial transaction. Payment for the delivery, sale and/or license of the software may be handled by the one or more servers of the software distribution platform and/or via a third-party payment entity. The servers enable purchasers and/or licensors to download the computer readable instructions 1582 from the software distribution platform 1605. For example, the software, which may correspond to example computer readable instructions, may be downloaded to the example processor platform(s), which is/are to execute the computer readable instructions 1582. In some examples, one or more servers of the software distribution platform 1605 are communicatively connected to one or more security domains and/or security devices through which requests and transmissions of the example computer readable instructions 1582 must pass. In some examples, one or more servers of the software distribution platform 1605 periodically offer, transmit, and/or force updates to the software (e.g., the example computer readable instructions 1582 of FIG. 15) to ensure improvements, patches, updates, etc. are distributed and applied to the software at the end user devices.

In the illustrated example of FIG. 16, the computer readable instructions 1582 are stored on storage devices of the software distribution platform 1605 in a particular format. A format of computer readable instructions includes, but is not limited to a particular code language (e.g., Java, JavaScript, Python, C, C#, SQL, HTML, etc.), and/or a particular code state (e.g., uncompiled code (e.g., ASCII), interpreted code, linked code, executable code (e.g., a binary), etc.). In some examples, the computer readable instructions 1582 stored in the software distribution platform 1605 are in a first format when transmitted to the example processor platform(s) 1610. In some examples, the first format is an executable binary in which particular types of the processor platform(s) 1610 can execute. However, in some examples, the first format is uncompiled code that requires one or more preparation tasks to transform the first format to a second format to enable execution on the example processor platform(s) 1610. For instance, the receiving processor platform(s) 1600 may need to compile the computer readable instructions 1582 in the first format to generate executable code in a second format that is capable of being executed on the processor platform(s) 1510. In still other examples, the first format is interpreted code that, upon reaching the processor platform(s) 1610, is interpreted by an interpreter to facilitate execution of instructions.

Implementation of the preceding techniques may be accomplished through any number of specifications, configurations, or example deployments of hardware and software. It should be understood that the functional units or capabilities described in this specification may have been referred to or labeled as components or modules, to more particularly emphasize their implementation independence.

Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field-programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as code rewriting and code analysis) may take place on a different processing system (e.g., in a computer in a data center), than that in which the code is deployed (e.g., in a computer embedded in a sensor or robot). Similarly, operational data may be identified and illustrated herein within components or modules and may be embodied in any suitable form and organized within any suitable type of data structure. The operational data may be collected as a single data set, or may be distributed over different locations including over different storage devices, and may exist, at least partially, merely as electronic signals on a system or network. The components or modules may be passive or active, including agents operable to perform desired functions.

Additional examples of the presently described method, system, and device embodiments include the following, non-limiting implementations. Each of the following non-limiting examples may stand on its own or may be combined in any permutation or combination with any one or more of the other examples provided below or throughout the present disclosure.

EXAMPLES

Example 1 is a computing device comprising: a processor; and memory to store instructions, which when executed by the processor, cause the computing device to: receive a workload as part of a workload migration process, from a source computing device over a network shared with the computing device; determine whether the workload has valid attestation; establish attestation for the workload when the workload does not have valid attestation; determine whether the attestation is compliant with a policy; and execute the workload when the attestation is compliant with the policy.

In Example 2, the subject matter of Example 1 includes, wherein the workload migration process is to migrate the workload from a cloud device to an edge device, or from an edge device to a cloud device.

In Example 3, the subject matter of Examples 1-2 includes, wherein the computing device is a centralized computing device that is designated as an attestation server for multiple computing devices in the network.

In Example 4, the subject matter of Examples 1-3 includes, wherein to determine whether the workload has valid attestation, the computing device is to verify the attestation with a centralized attestation service.

In Example 5, the subject matter of Examples 1-4 includes, wherein to determine whether the workload has valid attestation, the computing device is to verify the attestation by querying an immutable ledger.

In Example 6, the subject matter of Examples 1-5 includes, wherein to establish attestation for the workload, the computing device is to: perform forensic analysis on the workload; classify the workload to produce a workload classification; and generate an attestation stamp for the workload, wherein the attestation stamp includes details of the forensic analysis and the workload classification.

In Example 7, the subject matter of Examples 1-6 includes, wherein the attestation stamp is stored in a standardized language.

In Example 8, the subject matter of Example 7 includes, wherein the standardized language is YAML.

In Example 9, the subject matter of Examples 7-8 includes, wherein the standardized language is JavaScript Object Notation (JSON).

In Example 10, the subject matter of Examples 1-9 includes, wherein to establish attestation for the workload, the computing device is to: generate an attestation stamp; and store the attestation stamp in an immutable ledger.

In Example 11, the subject matter of Example 10 includes, wherein the immutable ledger is a blockchain.

In Example 12, the subject matter of Examples 1-11 includes, wherein the policy includes requirements related to one or more of: a requirement of the workload to have a certain security profile, a requirement that the workload have multiple attestations, a requirement that the workload have a new attestation created when crossing a network boundary, a requirement that the workload be locally attested, or a requirement that the workload be attested by a central controlling node.

In Example 13, the subject matter of Examples 1-12 includes, wherein the source computing device is in the same network cluster as the computing device.

In Example 14, the subject matter of Examples 1-13 includes, wherein the source computing device is in a different network cluster from the computing device.

In Example 15, the subject matter of Examples 1-14 includes, wherein the memory comprises instructions to cause the computing device to: analyze a common vulnerabilities and exposures (CVE) report to determine whether the workload has likely been infected with a vulnerability; and invalidate the attestation of the workload when the workload has likely been infected with the vulnerability.

Example 16 is a method performed by a computing device, comprising: receiving a workload as part of a workload migration process, from a source computing device over a network shared with the computing device; determining whether the workload has valid attestation; establishing attestation for the workload when the workload does not have valid attestation; determining whether the attestation is compliant with a policy; and executing the workload when the attestation is compliant with the policy.

In Example 17, the subject matter of Example 16 includes, wherein the workload migration process is to migrate the workload from a cloud device to an edge device, or from an edge device to a cloud device.

In Example 18, the subject matter of Examples 16-17 includes, wherein the computing device is a centralized computing device that is designated as an attestation server for multiple computing devices in the network.

In Example 19, the subject matter of Examples 16-18 includes, wherein determining whether the workload has valid attestation comprises verifying the attestation with a centralized attestation service.

In Example 20, the subject matter of Examples 16-19 includes, wherein determining whether the workload has valid attestation comprises verifying the attestation by querying an immutable ledger.

In Example 21, the subject matter of Examples 16-20 includes, wherein establishing attestation for the workload comprises: performing forensic analysis on the workload; classifying the workload to produce a workload classification; and generating an attestation stamp for the workload, wherein the attestation stamp includes details of the forensic analysis and the workload classification.

In Example 22, the subject matter of Examples 16-21 includes, wherein the attestation stamp is stored in a standardized language.

In Example 23, the subject matter of Example 22 includes, wherein the standardized language is YAML.

In Example 24, the subject matter of Examples 22-23 includes, wherein the standardized language is JavaScript Object Notation (JSON).

In Example 25, the subject matter of Examples 16-24 includes, wherein establishing attestation for the workload comprises: generating an attestation stamp; and storing the attestation stamp in an immutable ledger.

In Example 26, the subject matter of Example 25 includes, wherein the immutable ledger is a blockchain.

In Example 27, the subject matter of Examples 16-26 includes, wherein the policy includes requirements related to one or more of: a requirement of the workload to have a certain security profile, a requirement that the workload have multiple attestations, a requirement that the workload have a new attestation created when crossing a network boundary, a requirement that the workload be locally attested, or a requirement that the workload be attested by a central controlling node.

In Example 28, the subject matter of Examples 16-27 includes, wherein the source computing device is in the same network cluster as the computing device.

In Example 29, the subject matter of Examples 16-28 includes, wherein the source computing device is in a different network cluster from the computing device.

In Example 30, the subject matter of Examples 16-29 includes, analyzing a common vulnerabilities and exposures (CVE) report to determine whether the workload has likely been infected with a vulnerability; and invalidating the attestation of the workload when the workload has likely been infected with the vulnerability.

Example 31 is at least one machine-readable medium including instructions, which when executed by a machine, cause the machine to perform operations of any of the methods of Examples 16-30.

Example 32 is an apparatus comprising means for performing any of the methods of Examples 16-30.

Example 33 is at least one machine-readable medium including instructions, which when performed by a computing device, cause the computing device to: receive a workload as part of a workload migration process, from a source computing device over a network shared with the computing device; determine whether the workload has valid attestation; establish attestation for the workload when the workload does not have valid attestation; determine whether the attestation is compliant with a policy; and execute the workload when the attestation is compliant with the policy.

In Example 34, the subject matter of Example 33 includes, wherein the workload migration process is to migrate the workload from a cloud device to an edge device, or from an edge device to a cloud device.

In Example 35, the subject matter of Examples 33-34 includes, wherein the computing device is a centralized computing device that is designated as an attestation server for multiple computing devices in the network.

In Example 36, the subject matter of Examples 33-35 includes, wherein the instructions to determine whether the workload has valid attestation comprise instructions to verify the attestation with a centralized attestation service.

In Example 37, the subject matter of Examples 33-36 includes, wherein the instructions to determine whether the workload has valid attestation comprise instructions to verify the attestation by querying an immutable ledger.

In Example 38, the subject matter of Examples 33-37 includes, wherein the instructions establish attestation for the workload comprise instructions to: perform forensic analysis on the workload; classify the workload to produce a workload classification; and generate an attestation stamp for the workload, wherein the attestation stamp includes details of the forensic analysis and the workload classification.

In Example 39, the subject matter of Examples 33-38 includes, wherein the attestation stamp is stored in a standardized language.

In Example 40, the subject matter of Example 39 includes, wherein the standardized language is YAML.

In Example 41, the subject matter of Examples 39-40 includes, wherein the standardized language is JavaScript Object Notation (JSON).

In Example 42, the subject matter of Examples 33-41 includes, wherein the instructions to establish attestation for the workload comprise instructions to: generate an attestation stamp; and store the attestation stamp in an immutable ledger.

In Example 43, the subject matter of Example 42 includes, wherein the immutable ledger is a blockchain.

In Example 44, the subject matter of Examples 33-43 includes, wherein the policy includes requirements related to one or more of: a requirement of the workload to have a certain security profile, a requirement that the workload have multiple attestations, a requirement that the workload have a new attestation created when crossing a network boundary, a requirement that the workload be locally attested, or a requirement that the workload be attested by a central controlling node.

In Example 45, the subject matter of Examples 33-44 includes, wherein the source computing device is in the same network cluster as the computing device.

In Example 46, the subject matter of Examples 33-45 includes, wherein the source computing device is in a different network cluster from the computing device.

In Example 47, the subject matter of Examples 33-46 includes, instructions to: analyze a common vulnerabilities and exposures (CVE) report to determine whether the workload has likely been infected with a vulnerability; and invalidate the attestation of the workload when the workload has likely been infected with the vulnerability.

Example 48 is at least one machine-readable medium including instructions that, when executed by processing circuitry, cause the processing circuitry to perform operations to implement of any of Examples 1-47.

Example 49 is an apparatus comprising means to implement of any of Examples 1-47.

Example 50 is a system to implement of any of Examples 1-47.

Example 51 is a method to implement of any of Examples 1-47.

Auxiliary Example 1: A method by which trust for the workload is established by attestation of security key indicators on the destination node known as self-attestation.

Auxiliary Example 2: A method by which trust for the workload is established on behalf of the destination by the controller attestation server.

Auxiliary Example 3: A method by which trust for the workload is established by an attestation service.

Auxiliary Example 4: A method by which workload migration is carried out with a workload identifier across the nodes in the cloud-to-edge topology.

Auxiliary Example 5: A method by which workload is allowed for execution on the node if attested based on verification of stamp across node policy.

Auxiliary Example 6: A method by which workload is rejected for execution on the node if attested based on verification of stamp across node policy.

Auxiliary Example 7: A method by which workload is taken for fresh attestation on the node by example #1, #2 or #3 irrespective of the attestation status carried by the same.

Auxiliary Example 8: A method by which forensics are performed on the node for a given workload based on the type of workload.

Auxiliary Example 9: A method by which forensics are performed on the controller server for attestation based on type of workload.

Auxiliary Example 10: A method by which the tools and frameworks are agreed upon consensus of the involved parties.

Auxiliary Example 11: A method by which static and dynamic analysis of the workload is performed by the receiving node for secondary or further attestation.

Auxiliary Example 12: A method by which static and dynamic analysis of the workload is performed by the controller server on behalf of the receiving node (destination) for secondary or further attestation.

Auxiliary Example 13: A method by which static and dynamic analysis of the WL is performed by the controller server on behalf of the sender node (source) for secondary or further attestation.

Auxiliary Example 14: A method by which WL forensics are carried out for identification of privileges, permissions, vulnerabilities, performance, memory, disk, network, and compute consumption.

Auxiliary Example 15: A method by which range is marked for classification of the workload based on the key point indicator (KPIs) for the observations detected.

Auxiliary Example 16: A method by which the range/grade for each security KPI is clubbed in a specific format to form as attestation for the given workload.

Auxiliary Example 17: A method by which the range/grade for the security KPI is marked as very low, low, medium, high, and very high.

Auxiliary Example 18: A method by which the range/grade can be classified based on categories as in restricted, semi, or super privileged.

Auxiliary Example 19: A method by which the deployments on the node for the given workload happens based on clubbed attestation that is arrived from all previous executions.

Auxiliary Example 20: A method by which the receiver or destination node run the workload based on the overall attestation history.

Auxiliary Example 21: A method by which node policy is defined for acceptance or rejection of the workload based on the attestation.

Auxiliary Example 22: A method by which workload run happens based on the attestation verified across node policy that is pre-defined.

Auxiliary Example 23: A method by which the appended attestations are returned to the sender (source) node for the given workload identifier.

Auxiliary Example 24: A method by which the attestations made for the workload are crypto protected by the sender and receiver.

Auxiliary Example 25: A method by which the workloads migrate in the cloud-to-edge topology with encrypted attestations from the source to destination.

Auxiliary Example 26: A method by which deployment of the workload is allowed based on the trust stamps arrived from previous forensic evaluations with double, triple, or multiple attestations.

Auxiliary Example 27: A method by which deployment of the workload happens only if attested by the controller server.

Auxiliary Example 28: A method by which re-attestation happens at the boundary of network.

Auxiliary Example 29: A method by which re-attestation happens if there is a new vulnerability detected post attestation.

Auxiliary Example 30: A method by which the attestation is bundled up with the workload as a payload or schema without changing the format of the same.

Auxiliary Example 31: A method by which the attestation is bundled up with the workload as part of its definition in the YAMLs, packages (HELM or Docker Compose for container images), deployment configs or templates.

Auxiliary Example 32: A method by which the stamp (aka attestation token) will hold metadata for the given workload including <WL Origin, WL Identifier, WL type, WL classification, WL Compression type, WL encryption status or mode> but not limited to inclusive biometrics.

Auxiliary Example 33: A method by which the controller attestation server (service) can be centric to cluster or in federated mode across clusters as well.

Auxiliary Example 34: A method by which more than one replica of the controller attestation server (service) can exist.

Auxiliary Example 35: A method by which attestation by controller or node is stored in the cluster in protected mode.

Auxiliary Example 36: A method by which the trust made by attestations on the workloads being protected by crypto hardware.

Auxiliary Example 37: A method by which workload(s) become quarantined on detection of Common Vulnerabilities and Exposures (CVE) post attestations.

Centralized Workload Architecture Examples

Auxiliary Example 38: A method by which all the attestations made for a given workload is made by the attestation service in the controller (leader) node within the control plane.

Auxiliary Example 39: A method by which all the attestations made for a given workload is made by the assisting attestation service in special assisting nodes of extended control plane.

Auxiliary Example 40: A method by which all the attestations made for a given workload is made by the attestation service in virtual cluster control plane.

Auxiliary Example 41: A method by which all the attestations made for a given workload is made by the attestation service in the controller host control plane with host cluster which is leader of all controller control planes.

Auxiliary Example 42: A method by which all the attestations made for a given workload is made by the attestation service in a multi-cluster environment.

Auxiliary Example 43: Based on Example 41, a method by which ALL the attestations made for a given workload is made by the attestation service in some of the clusters only and not by all clusters.

Auxiliary Example 43: Based on Auxiliary Examples 38), 39), 40), 41), a method by which clusters participating for attestations can be optional.

Auxiliary Example 44: A method by which the attestations made by the attestation server is placed in an immutable key storage or hyper ledger (blockchain, keychain).

Auxiliary Example 45: A method by which trust attestations can be placed in a remote location pointed to by the workloads by a reference or URL.

Auxiliary Example 43: A method by which the attestation received is verifiable on an as-needed basis.

Auxiliary Example 44: A method by which attestation received is verified implicitly.

Auxiliary Example 45: A method by which code coverage made for attestation on the workload is reported.

Auxiliary Example 46: A method by which trust attestations can be attached and detached with workloads.

In the above Detailed Description, various features may be grouped to streamline the disclosure. However, claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment.

What is claimed is:

1. A computing device comprising:

a processor; and memory to store instructions, which when executed by the processor, cause the computing device to:

receive a workload as part of a workload migration process, the workload being accompanied by a payload comprising one or more attestation stamps generated by one or more respective computing nodes that previously hosted the workload, from a source computing device over a network shared with the computing device;

determine whether the workload has valid attestation by verifying a cryptographically-signed attestation stamp of the one or more attestation stamps associated with the workload;

establish attestation for the workload when the workload does not have valid attestation, wherein establishing the attestation comprises generating a second cryptographically-signed attestation stamp comprising at least an origin identifier, a workload identifier, a workload classification, and a checksum of the workload;

determine whether the attestation is compliant with a policy; and execute the workload when the attestation is compliant with the policy.

2. The computing device of claim 1, wherein the workload migration process is to migrate the workload from a cloud device to an edge device, or from an edge device to a cloud device.

3. The computing device of claim 1, wherein the computing device is a centralized computing device that is designated as an attestation server for multiple computing devices in the network.

4. The computing device of claim 1, wherein to determine whether the workload has valid attestation, the computing device is to verify the attestation with a centralized attestation service.

5. The computing device of claim 1, wherein to determine whether the workload has valid attestation, the computing device is to verify the attestation by querying an immutable ledger.

6. The computing device of claim 1, wherein to establish attestation for the workload, the computing device is to:

perform forensic analysis on the workload;

classify the workload to produce a workload classification; and generate the second cryptographically-signed attestation stamp for the workload, wherein the second cryptographically-signed attestation stamp includes details of the forensic analysis and the workload classification.

7. The computing device of claim 1, wherein the second cryptographically-signed attestation stamp is stored in a standardized language.

8. The computing device of claim 7, wherein the standardized language is YAML.

9. The computing device of claim 7, wherein the standardized language is JavaScript Object Notation (JSON).

10. The computing device of claim 1, wherein to establish attestation for the workload, the computing device is to:

store the second cryptographically-signed attestation stamp in an immutable ledger.

11. The computing device of claim 10, wherein the immutable ledger is a blockchain.

12. The computing device of claim 1, wherein the policy includes requirements related to one or more of: a requirement of the workload to have a certain security profile, a requirement that the workload have multiple attestations, a requirement that the workload have a new attestation created when crossing a network boundary, a requirement that the workload be locally attested, or a requirement that the workload be attested by a central controlling node.

13. The computing device of claim 1, wherein the memory comprises instructions to cause the computing device to:

analyze a common vulnerabilities and exposures (CVE) report to determine whether the workload has likely been infected with a vulnerability; and invalidate the attestation of the workload when the workload has likely been infected with the vulnerability.

14. The computing device of claim 1, wherein the workload comprises one or more of a software archive, a software package, a container image, or a set of executable binaries.

15. The computing device of claim 1, wherein the workload was previously deployed at the source computing device.

16. A method performed by a computing device, comprising:

receiving a workload as part of a workload migration process, the workload being accompanied by a payload comprising one or more attestation stamps generated by one or more respective computing nodes that previously hosted the workload, from a source computing device over a network shared with the computing device;

determining whether the workload has valid attestation by verifying a cryptographically-signed attestation stamp of the one or more attestation stamps associated with the workload;

establishing attestation for the workload when the workload does not have valid attestation, wherein establishing the attestation comprises generating a second cryptographically-signed attestation stamp comprising at least an origin identifier, a workload identifier, a workload classification, and a checksum of the workload;

determining whether the attestation is compliant with a policy; and executing the workload when the attestation is compliant with the policy.

17. The method of claim 16, wherein determining whether the workload has valid attestation comprises verifying the attestation by querying an immutable ledger.

18. The method of claim 16, wherein establishing attestation for the workload comprises:

performing forensic analysis on the workload;

classifying the workload to produce a workload classification; and generating the second cryptographically-signed attestation stamp for the workload, wherein the second cryptographically-signed attestation stamp includes details of the forensic analysis and the workload classification.

19. At least one non-transitory machine-readable medium including instructions, which when performed by a computing device, cause the computing device to:

receive a workload as part of a workload migration process, the workload being accompanied by a payload comprising one or more attestation stamps generated by one or more respective computing nodes that previously hosted the workload, from a source computing device over a network shared with the computing device;

determine whether the workload has valid attestation by verifying a cryptographically-signed attestation stamp of the one or more attestation stamps associated with the workload;

establish attestation for the workload when the workload does not have valid attestation, wherein establishing the attestation comprises generating a second cryptographically-signed attestation stamp comprising at least an origin identifier, a workload identifier, a workload classification, and a checksum of the workload;

determine whether the attestation is compliant with a policy; and execute the workload when the attestation is compliant with the policy.

20. The non-transitory machine-readable medium of claim 19, wherein the instructions establish attestation for the workload comprise instructions to:

perform forensic analysis on the workload;

classify the workload to produce a workload classification; and generate the second cryptographically-signed attestation stamp for the workload, wherein the second cryptographically-signed attestation stamp includes details of the forensic analysis and the workload classification.

* * * * *